US012801591B2

(12) United States Patent
Sorrentino et al.

(10) Patent No.: US 12,801,591 B2
(45) Date of Patent: Nov. 17, 2026

(54) DEVICE, SYSTEM AND METHOD FOR UNLOCKING ELECTRONIC MESSAGES FOR DATABASE UPDATES

(71) Applicant: AMADEUS S.A.S., Biot (FR)

(72) Inventors: Alexandra Sorrentino, Mougins (FR); Rodolphe Texier, Vallauris (FR); David Vanloo, Juan Les Pins (FR); Nicholas Ware, Hampton (GB)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 19/233,357

(22) Filed: Jun. 10, 2025

(65) Prior Publication Data

US 2025/0378067 A1 Dec. 11, 2025

(30) Foreign Application Priority Data

Jun. 11, 2024 (EP) .................................... 24315282

(51) Int. Cl.
*G06F 16/23* (2019.01)

(52) U.S. Cl.
CPC ................................ *G06F 16/2379* (2019.01)

(58) Field of Classification Search
CPC ......................... G06F 16/2379; G06F 16/2372
See application file for complete search history.

(56) References Cited

U.S. PATENT DOCUMENTS 9,990,621 B1 6/2018 Ng et al.
2016/0315900 A1* 10/2016 Rowny .................. H04L 45/24
2018/0176160 A1* 6/2018 Steller .................. H04L 67/306
2019/0197033 A1* 6/2019 Esposito ............. G06F 16/2322
2021/0194834 A1* 6/2021 Hopkins ............... H04L 51/216
2022/0078797 A1* 3/2022 Helms ........................ G06F 3/02
2023/0117329 A1* 4/2023 Park ....................... G06Q 40/04
705/37
2024/0106906 A1* 3/2024 Dunjic .................... H04L 67/34

FOREIGN PATENT DOCUMENTS

CA 3014221 A1 2/2020
WO WO-2020228562 A1 11/2020

* cited by examiner

*Primary Examiner* — Charles Rones
*Assistant Examiner* — Mohammad S Bhuyan
(74) *Attorney, Agent, or Firm* — PERRY + CURRIER INC.

(57) ABSTRACT

A computing device receives a first electronic message representing a plurality of resources, generates a plurality of second electronic messages corresponding to the plurality of resources represented by the first electronic message, each of the plurality of second electronic messages representing a respective resource, of the plurality of resources, and stores the plurality of second electronic messages at respective databases associated with respective resource provisioning, the plurality of second electronic messages initially locked at the respective databases. After one or more of a given time period, and receiving confirmation, via a graphic user interface (GUI), of one or more respective resources being provisioned, the computing device unlocks respective second electronic messages in the respective databases, and delivers unlocked second electronic messages to respective external databases associated with the respected resource provisioning.

20 Claims, 16 Drawing Sheets

DEVICE, SYSTEM AND METHOD FOR UNLOCKING ELECTRONIC MESSAGES FOR DATABASE UPDATES

FIELD

The specification relates generally to databases, and specifically to a device, system and method for unlocking electronic messages for database updates.

BACKGROUND

Updating databases is associated with a variety of technical problems. For example, while such database updates may occur automatically, in some instances, such automatic updates of databases may lead to errors in the updates and/or the databases. In a particular example, certain data that is used to update a database may represent certain resources, and automatic updating of a database may result in inaccurate representation how the resources are provisioned. Such inaccuracy of a database may cause a waste of processing resources and/or bandwidth in attempting to obviate the inaccuracy, however an inaccurate database may lead to further errors as data in the database is processed.

SUMMARY

A first aspect of the present specification provides a method comprising: receiving, at a computing device, a first electronic message representing a plurality of resources; generating, via the computing device, a plurality of second electronic messages corresponding to the plurality of resources represented by the first electronic message, each of the plurality of second electronic messages representing a respective resource, of the plurality of resources; storing, via the computing device, the plurality of second electronic messages at respective databases associated with respective resource provisioning, the plurality of second electronic messages initially locked at the respective databases; after one or more of a given time period, and receiving confirmation, via a graphic user interface (GUI), of one or more respective resources being provisioned, unlocking, via the computing device, respective second electronic messages in the respective databases; and delivering, via the computing device, unlocked second electronic messages to respective external databases associated with the respective resource provisioning.

The method of the first aspect may further comprise: receiving, within the given time period, via the GUI, an indication that a given respective resource was not provisioned; and, in response: transmitting a third electronic message to a communication device associated with generation of the first electronic message, the third electronic message acknowledging that the given respective resource was not provisioned.

The method of the first aspect may further comprise: receiving, within the given time period, via the GUI, an indication that a given respective resource was not provisioned; and, in response: transmitting a third electronic message to a communication device associated with generation of the first electronic message, the third electronic message including a respective GUI for providing one or more selectable options for managing the given respective resource that was not provisioned.

At the method of the first aspect, the respective databases may comprise one respective database per resource provisioner.

At the method of the first aspect, the respective databases may comprise one respective database per resource provisioner and per resource provisioning gateway entity.

At the method of the first aspect, the plurality of second electronic messages may include respective second electronic messages associated with a resource provisioning gateway entity.

The method of the first aspect may further comprise: updating one or more of the plurality of second electronic messages initially locked at the respective databases with a respective provisioning status.

At the method of the first aspect, a given second electronic message may comprise a record of the respective resource provisioning.

The method of the first aspect may further comprise: accumulating a plurality of first electronic messages, including the first electronic message, the plurality of first electronic messages associated with a first originating region; accumulating a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums; comparing respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same; and delivering the accumulated respective first remittances to the respective external databases associated with the first resources associated with the first originating region associated with the accumulated respective further first remittances of the unlocked further first electronic messages; and delivering the accumulated respective further first remittances to the respective external databases associated with the second resources associated with the second originating region associated with the accumulated respective further first remittances of the unlocked further first electronic messages. In some of these examples, accumulating of the plurality of first electronic messages and the plurality of further first electronic messages may occur for a respective given time period.

A second aspect of the present specification provides a computing device comprising: at least one controller; and a computer-readable storage medium having stored thereon program instructions that, when executed by the at least one controller, causes the at least one controller to perform a set of operations comprising: receiving a first electronic message representing a plurality of resources; generating a plurality of second electronic messages corresponding to the plurality of resources represented by the first electronic message, each of the plurality of second electronic messages representing a respective resource, of the plurality of resources; storing the plurality of second electronic messages at respective databases associated with respective resource provisioning, the plurality of second electronic messages initially locked at the respective databases; after one or more of a given time period, and receiving confirmation, via a graphic user interface (GUI), of one or more respective resources being provisioned, unlocking respective second electronic messages in the respective databases;

and delivering unlocked second electronic messages to respective external databases associated with the respective resource provisioning.

At the computing device of the second aspect, the set of operations may further comprise: receiving, within the given time period, via the GUI, an indication that a given respective resource was not provisioned; and, in response: transmitting a third electronic message to a communication device associated with generation of the first electronic message, the third electronic message acknowledging that the given respective resource was not provisioned.

At the computing device of the second aspect, the set of operations may further comprise: receiving, within the given time period, via the GUI, an indication that a given respective resource was not provisioned; and, in response: transmitting a third electronic message to a communication device associated with generation of the first electronic message, the third electronic message including a respective GUI for providing one or more selectable options for managing the given respective resource that was not provisioned.

At the computing device of the second aspect, the respective databases may comprise one respective database per resource provisioner.

At the computing device of the second aspect, the respective databases may comprise one respective database per resource provisioner and per resource provisioning gateway entity.

At the computing device of the second aspect, the plurality of second electronic messages may include respective second electronic messages associated with a resource provisioning gateway entity.

At the computing device of the second aspect, the set of operations may further comprise: updating one or more of the plurality of second electronic messages initially locked at the respective databases with a respective provisioning status.

At the computing device of the second aspect, a given second electronic message may comprise a record of the respective resource provisioning.

At the computing device of the second aspect, the set of operations may further comprise: accumulating a plurality of first electronic messages, including the first electronic message, the plurality of first electronic messages associated with a first originating region; accumulating a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums; comparing respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same; and delivering the accumulated respective first remittances to the respective external databases associated with the first resources associated with the first originating region associated with the accumulated respective further first remittances of the unlocked further first electronic messages; and delivering the accumulated respective further first remittances to the respective external databases associated with the second resources associated with the second originating region associated with the accumulated respective further first remittances of the unlocked further first electronic messages. In some of these examples, accumulating of the plurality of first electronic messages and the plurality of further first electronic messages may occur for a respective given time period.

A third aspect of the present specification provides a non-transitory computer-readable storage medium having stored thereon program instructions that, when executed by at least one computing device, causes the at least one computing device to perform a method comprising: receiving, at a computing device, a first electronic message representing a plurality of resources; generating, via the computing device, a plurality of second electronic messages corresponding to the plurality of resources represented by the first electronic message, each of the plurality of second electronic messages representing a respective resource, of the plurality of resources; storing, via the computing device, the plurality of second electronic messages at respective databases associated with respective resource provisioning, the plurality of second electronic messages initially locked at the respective databases; after one or more of a given time period, and receiving confirmation, via a graphic user interface (GUI), of one or more respective resources being provisioned, unlocking, via the computing device, respective second electronic messages in the respective databases; and delivering, via the computing device, unlocked second electronic messages to respective external databases associated with the respective resource provisioning.

The method of the second aspect may further comprise: receiving, within the given time period, via the GUI, an indication that a given respective resource was not provisioned; and, in response: transmitting a third electronic message to a communication device associated with generation of the first electronic message, the third electronic message acknowledging that the given respective resource was not provisioned.

The method of the second aspect may further comprise: receiving, within the given time period, via the GUI, an indication that a given respective resource was not provisioned; and, in response: transmitting a third electronic message to a communication device associated with generation of the first electronic message, the third electronic message including a respective GUI for providing one or more selectable options for managing the given respective resource that was not provisioned.

At the method of the second aspect, the respective databases may comprise one respective database per resource provisioner.

At the method of the second aspect, the respective databases may comprise one respective database per resource provisioner and per resource provisioning gateway entity.

At the method of the second aspect, the plurality of second electronic messages may include respective second electronic messages associated with a resource provisioning gateway entity.

The method of the second aspect may further comprise: updating one or more of the plurality of second electronic messages initially locked at the respective databases with a respective provisioning status.

At the method of the second aspect, a given second electronic message may comprise a record of the respective resource provisioning.

The method of the third aspect may further comprise: accumulating a plurality of first electronic messages, including the first electronic message, the plurality of first electronic messages associated with a first originating region;

accumulating a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums; comparing respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same; and delivering the accumulated respective first remittances to the respective external databases associated with the first resources associated with the first originating region associated with the accumulated respective further first remittances of the unlocked further first electronic messages; and delivering the accumulated respective further first remittances to the respective external databases associated with the second resources associated with the second originating region associated with the accumulated respective further first remittances of the unlocked further first electronic messages. In some of these examples, accumulating of the plurality of first electronic messages and the plurality of further first electronic messages may occur for a respective given time period.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
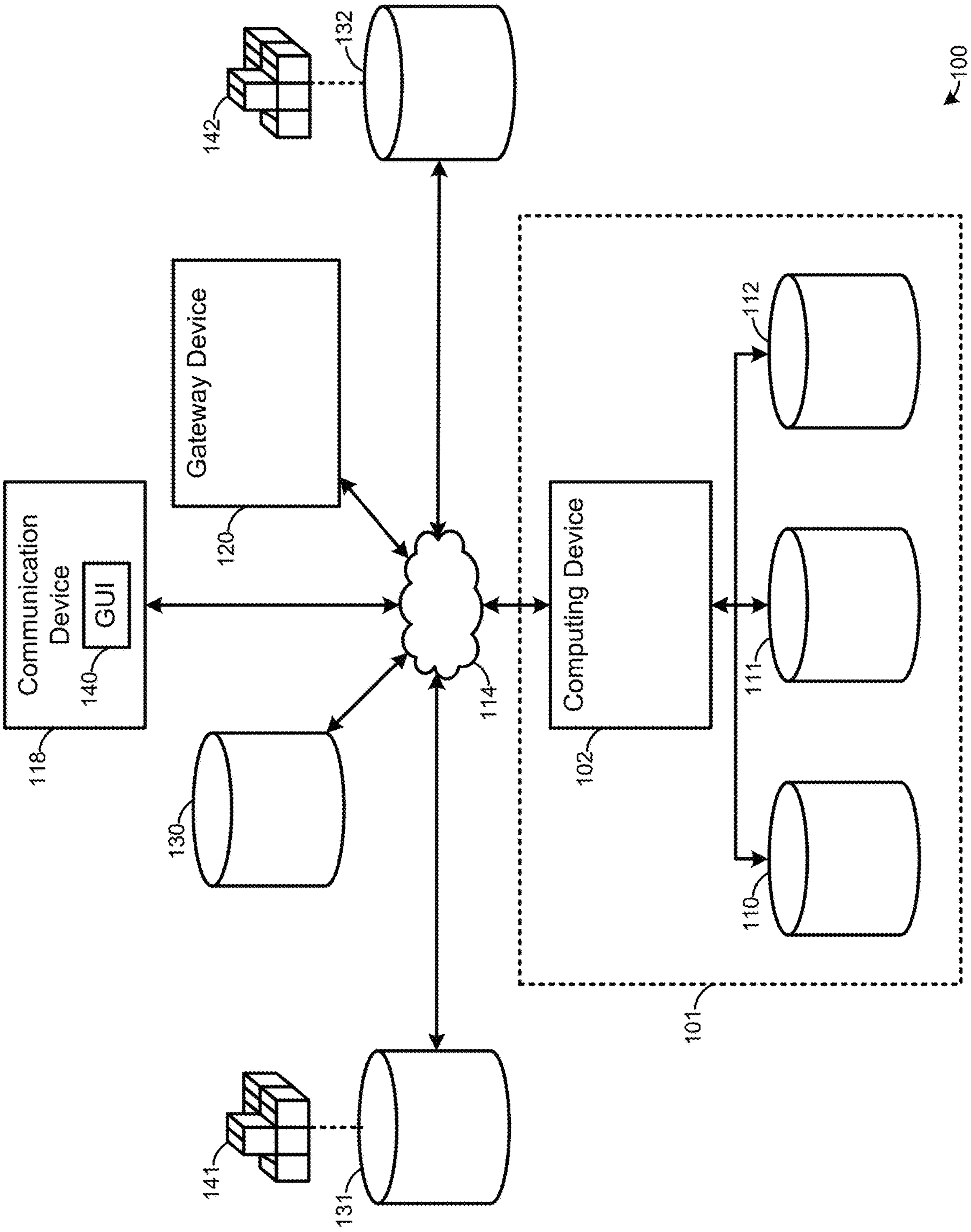
FIG. 1 depicts a system for unlocking electronic messages for database updates, according to non-limiting examples.

FIG. 1 depicts a system 100 for unlocking electronic messages for database updates. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a subsystem 101, and the subsystem comprises a computing device 102 in communication with a plurality of databases 110, 111, 112. The subsystem 101 is indicated via a box, depicted in broken lines, around the computing device 102 and the databases 110, 111, 112. It is understood that while the computing device 102 and the databases 110, 111, 112 may be distributed, and/or remote from each other, the computing device 102 and the databases 110, 111, 112 are nonetheless associated, with the computing device 102 managing the databases 110, 111, 112, as described herein. Hence, herein, components of the system 100 that are not components of the subsystem 101 may be referred to external components and/or components external to the subsystem 101.

Furthermore, while the computing device 102 and the databases 110, 111, 112 are depicted as separate from each other, in other examples, one or more of the databases 110, 111, 112 may be components of a memory of the computing device 102.

As depicted, the system 100 further comprises a communication network 114 (e.g., interchangeably referred to hereafter as the network 114), a communication device 118, a gateway device 120, and databases 130, 131, 132. The computing device 102 is understood to be in communication with the communication device 118, the gateway device 120, the databases 130, 131, 132 via the network 114. Furthermore, the communication device 118 and the gateway device 120 may communicate via the network 114.

The communication device 118, the gateway device 120, and the databases 130, 131, 132 are understood to be external to the subsystem 101. As such, the communication device 118 may be referred to as an external communication device 118, the gateway device 120 may be referred to as an external gateway device 120, and the databases 130, 131, 132 may be referred to as external databases 130, 131, 132.

As depicted, the database 110 of the subsystem 101 is understood to be associated with the gateway device 120, the database 111 of the subsystem 101 is understood to be associated with the external database 131, and the database 112 of the subsystem 101 is understood to be associated with the external database 132. For example, the computing device 102 may manage updates to the external databases 130, 131, 132 and the respective databases 110, 111, 112 on the basis of electronic messages received from the gateway device 120 (and, in some instances, from the communication device 118). For example, the respective databases 110, 111, 112 may comprise intermediary databases of the subsystem 101 that may temporarily store certain electronic messages used in the updates to the external databases 130, 131, 132, as described herein.

The external databases 131, 132 are further depicted in association with respective resources 141, 142, that may be provisioned to persons and/or locations and/or electronic components, and the like, associated with the communication device 118, and such electronic components associated with the communication device 118 may include, but are not limited to, the communication device 118 itself. While not depicted for simplicity, it is understood that the system 100 may further comprise any suitable computing devices for provisioning the resources 141, 142 to persons and/or locations and/or electronic components, and the like, associated with the communication device 118; such computing devices are understood to be in communication with at least the gateway device 120 via the network 114.

In particular, the external databases 131, 132 and the respective resources 141, 142 may be associated with respective resource provisioners.

Furthermore, the external database 130 and the gateway device [129] 120 may be associated with a resource provisioning gateway entity.

In particular, the communication device 118 may be operated to communicate with the gateway device 120 to initiate provisioning to the resources 141, 142.

As the respective databases 111, 112 of the subsystem 101 are associated with respective external databases 131, 132, and as the respective external databases 130, 131, 132 are associated with respective resources 141, 142 that may be provisioned to persons and/or locations and/or electronic components, and the like, associated with the communication device 118, the respective databases 111, 112 may be alternatively referred to as databases 111, 112 associated with respective resource provisioning.

In particular, the respective databases 111, 112 may comprise one respective database 111, 112 per resource provisioner. For example, as the respective databases 111, 112 of the subsystem 101 are associated with respective external databases 131, 132, that are in turn associated with respective resource provisioners, it is understood that the database 111 is associated with a resource provisioner of the external database 131 and the resources 141, and the database 112 is associated with a resource provisioner of the external database 132 and the resources 142.

Furthermore, the respective databases 110, 111, 112 may comprise one respective database 110, 111, 112 per resource provisioner and per resource provisioning gateway entity.

For example, as has already been described, the respective databases 111, 112 may comprise one respective database 111, 112 per resource provisioner. In addition, as the respective database 110 is associated with the external database 130 and the gateway device 120, which are associated with a resource provisioning gateway entity, there is one respective database 110 associated with the resource provisioning gateway entity.

In particular, while not depicted, the system 100 may comprise a plurality of gateway devices (e.g., similar to, and including, the gateway device 120) and associated external databases (e.g., similar to, and including, the external database 130) associated with different respective resource provisioning gateway entity, and, in these examples, the subsystem 101 may comprise one database (e.g., such as the database 110) per resource provisioning gateway entity. Such a plurality of gateway devices may act as gateways for different communication devices similar to the communication device 118. Indeed, the system 100 may comprise a plurality of communication devices 118.

In particular, the various entities associated with the different databases 110, 111, 112 may have access to their associated databases 110, 111, 112 (e.g., via any suitable respective computing and/or communication devices, such as the gateway device 120), for example to review the status of locked messages as described herein.

The computing device 102 may comprise any suitable combination of one or more servers, one or more cloud computing devices, one or more personal computers, one or more laptops, and the like.

The communication device 118 may comprise any suitable client device including, but not limited to a mobile device, a cell phone, a mobile phone, a tablet, a laptop, a personal computer, and the like. As depicted, the communication device 118 is further implementing a graphic user interface (GUI) 140 that may assist in database updates as described herein.

The gateway device 120 may comprise any suitable device including, but not limited to, a server, a cloud computing device, and the like.

Prior to describing the database updates, certain components of the computing device 102 will be described. While depicted as one device, the computing device 102 may comprise one or more computing devices and/or one or more cloud computing devices that may be geographically distributed.

Figure 2:
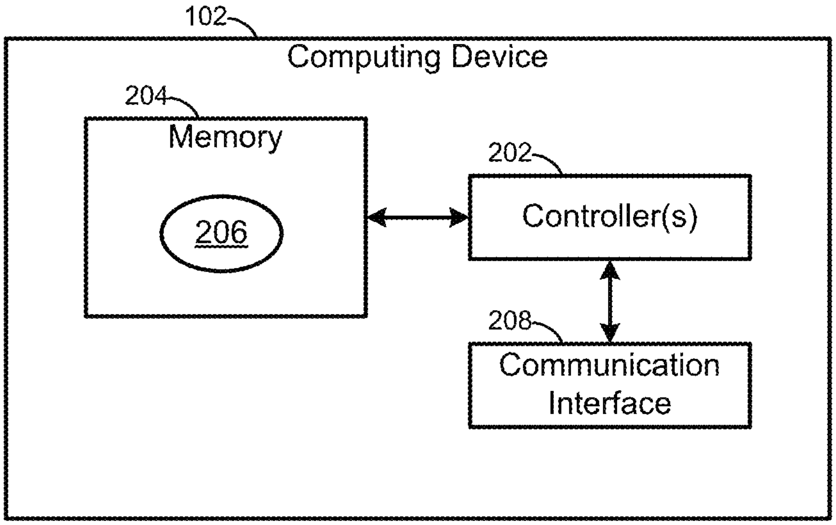
FIG. 2 depicts a computing device for unlocking electronic messages for database updates, according to non-limiting examples.

As shown in FIG. 2, the computing device 102 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the computing device 102 to communicate with the other components of the system 100, though it is understood such communication may occur locally when components of the system 100 are combined. The communication interface 208 therefore may include any necessary components (e.g., network interface controllers (NICs), radio units, and the like) to communicate with components of the system 100. The specific components of the communication interface 208 may be selected based on upon a nature of one or more networks that the components of the system 100 use to communicate, and/or local communication between components of the system 100, and the like. The computing device 102 may also include input and output devices connected to the controller 202, such as keyboards, pointing devices, display screens, and the like (not shown).

The components of the computing device 102 mentioned above may be deployed in a single enclosure, or in a distributed format. In some examples, therefore, the computing device 102 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the computing device 102; regardless, the controller 202 is understood to have access to the memory 204.

Furthermore the application 206 may comprise computer-readable programming instructions, executable by the controller 202.

Figure 3:
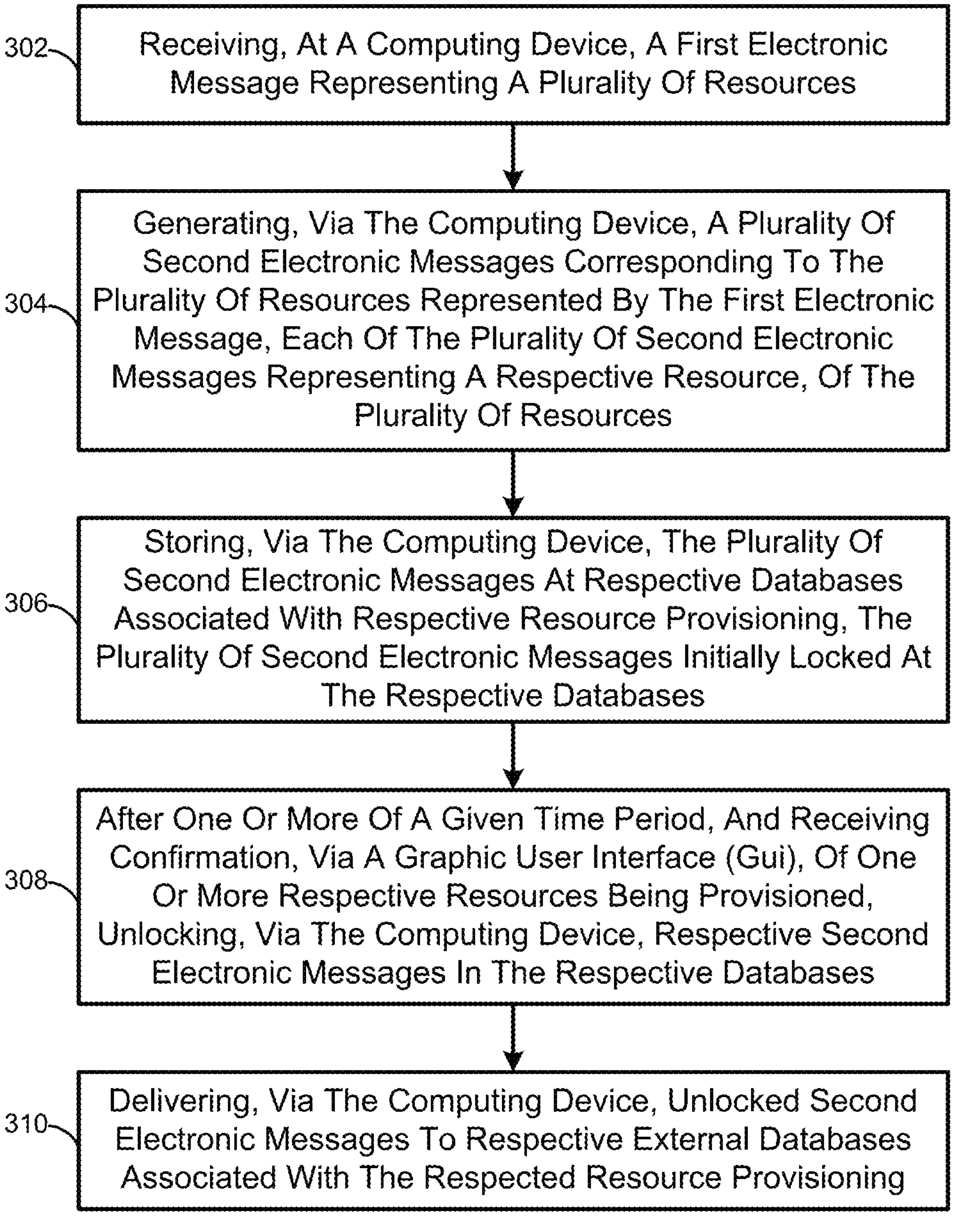
FIG. 3 depicts a method for unlocking electronic messages for database updates, according to non-limiting examples.
Figure 16:
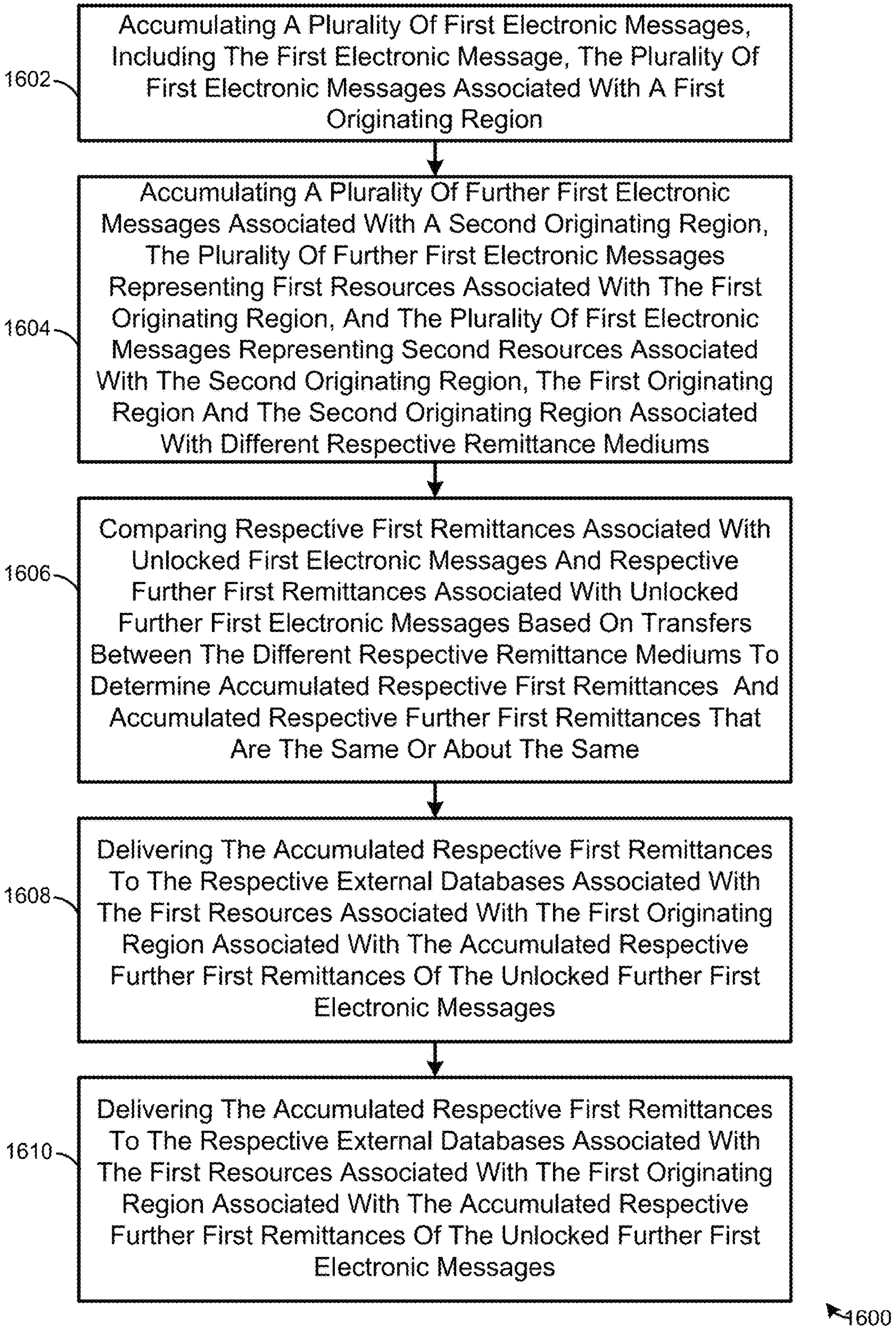
FIG. 16 depicts a method of adjusting electronic messages associated with different regions, according to non-limiting examples.

As will be understood by those skilled in the art, the controller 202 executes the instructions of the application 206 in order to perform a set of operations defined by the instructions contained therein including, but not limited to, the blocks of a method described with respect to FIG. 3, and/or the blocks of a method described with respect to FIG. 16. In the description below, the controller 202, and more generally the computing device 102, are understood to be configured to perform those actions. It will be understood that they are so configured via the execution (by the controller 202) of the instructions of the application stored in the memory 204. Put another way, the computing device 102 may comprise a computer-readable storage medium (e.g., a non-transitory computer-readable storage medium, such as the memory 204) having stored thereon program instructions that, when executed by the controller 202, causes the controller 202 to perform a set of operations comprising blocks of a method described with respect to FIG. 3. Alternatively, or in addition, the computing device 102 may comprise a computer-readable storage medium (e.g., a non-transitory computer-readable storage medium, such as the memory 204) having stored thereon program instructions that, when executed by the controller 202, causes the controller 202 to perform a set of operations comprising blocks of a method described with respect to FIG. 16.

While structures of the communication device 118 and the gateway device 120 are not described in detail, the communication device 118 and the gateway device 120 may have a similar structure as the computing device 102, but adapted for respective functionality of the communication device 118.

For example, the communication device 118 may comprise any suitable combination of input and output devices such as a display screen, a touch screen, a keyboard, a pointing device, and the like. In particular, the communication device 118 may comprise one or more of a display screen and a touch screen for providing the GUI 140.

Attention is now directed to FIG. 3 which depicts a flowchart representative of a method 300 for unlocking electronic messages for database updates. The operations of the method 300 of FIG. 3 correspond to machine readable instructions that are executed by the computing device 102, and specifically the controller 202 of the computing device 102. In the illustrated example, the instructions represented by the blocks of FIG. 3 are stored at the memory 204 for example, as the application 206. The method 300 of FIG. 3 is one way in which the system 100 and/or the computing device 102 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of, as well.

At a block 302, the controller 202, and/or the computing device 102, receives a first electronic message representing a plurality of resources. For example, the first electronic message may be received from the communication device 118.

At a block 304, the controller 202, and/or the computing device 102, generates a plurality of second electronic messages corresponding to the plurality of resources represented by the first electronic message, each of the plurality of second electronic messages representing a respective resource, of the plurality of resources.

At a block 306, the controller 202, and/or the computing device 102, stores the plurality of second electronic messages at respective databases 111, 112 associated with respective resource provisioning, the plurality of second electronic messages initially locked at the respective databases.

At a block 308, the controller 202, and/or the computing device 102, after one or more of a given time period, and receiving confirmation, via the GUI 140, of one or more respective resources being provisioned, unlocks respective second electronic messages in the respective databases 111, 112.

At a block 310, the controller 202, and/or the computing device 102, delivers unlocked second electronic messages to respective external databases 130, 131, 132 associated with the respective resource provisioning.

The method 300 may include other features.

For example, the method 300 may further comprise the controller 202, and/or the computing device 102: receiving, within the given time period, via the GUI 140, an indication that a given respective resource was not provisioned; and, in response: transmitting a third electronic message to the communication device 118 associated with generation of the first electronic message, the third electronic message acknowledging that the given respective resource was not provisioned.

In yet further examples, the method 300 may further comprise the controller 202, and/or the computing device 102: receiving, within the given time period, via the GUI 140, an indication that a given respective resource was not provisioned; and, in response: transmitting a third electronic message to the communication device 118 associated with generation of the first electronic message, the third electronic message including a respective GUI for providing one or more selectable options for managing the given respective resource that was not provisioned.

Furthermore, it is understood that the respective databases of the method 300 may comprise one respective database 111, 112 per resource provisioner.

Furthermore, it is understood that the respective databases of the method 300 may comprise one respective database 110, 111, 112 per resource provisioner and per resource provisioning gateway entity.

Furthermore, at the method 300, the plurality of second electronic messages may include respective second electronic messages associated with a resource provisioning gateway entity.

In some examples, the method 300 may further comprise the controller 202, and/or the computing device 102: updating one or more of the plurality of second electronic messages initially locked at the respective databases 111, 112 with a respective provisioning status.

Furthermore, at the method 300, a given second electronic message may comprise a record of respective resource provisioning.

Attention is next directed to FIG. 4, FIG. 5, FIG. 6, FIG. 7, FIG. 8, FIG. 9, FIG. 10, FIG. 11, FIG. 12, FIG. 13, FIG. 14 and FIG. 15, which depict an example of the method 300. FIG. 4, FIG. 5, FIG. 6, FIG. 7, FIG. 8, FIG. 9, FIG. 10, FIG. 11, FIG. 12, FIG. 13, FIG. 14 and FIG. 15 are substantially similar to FIG. 1, with like components having like numbers.

Figure 4:
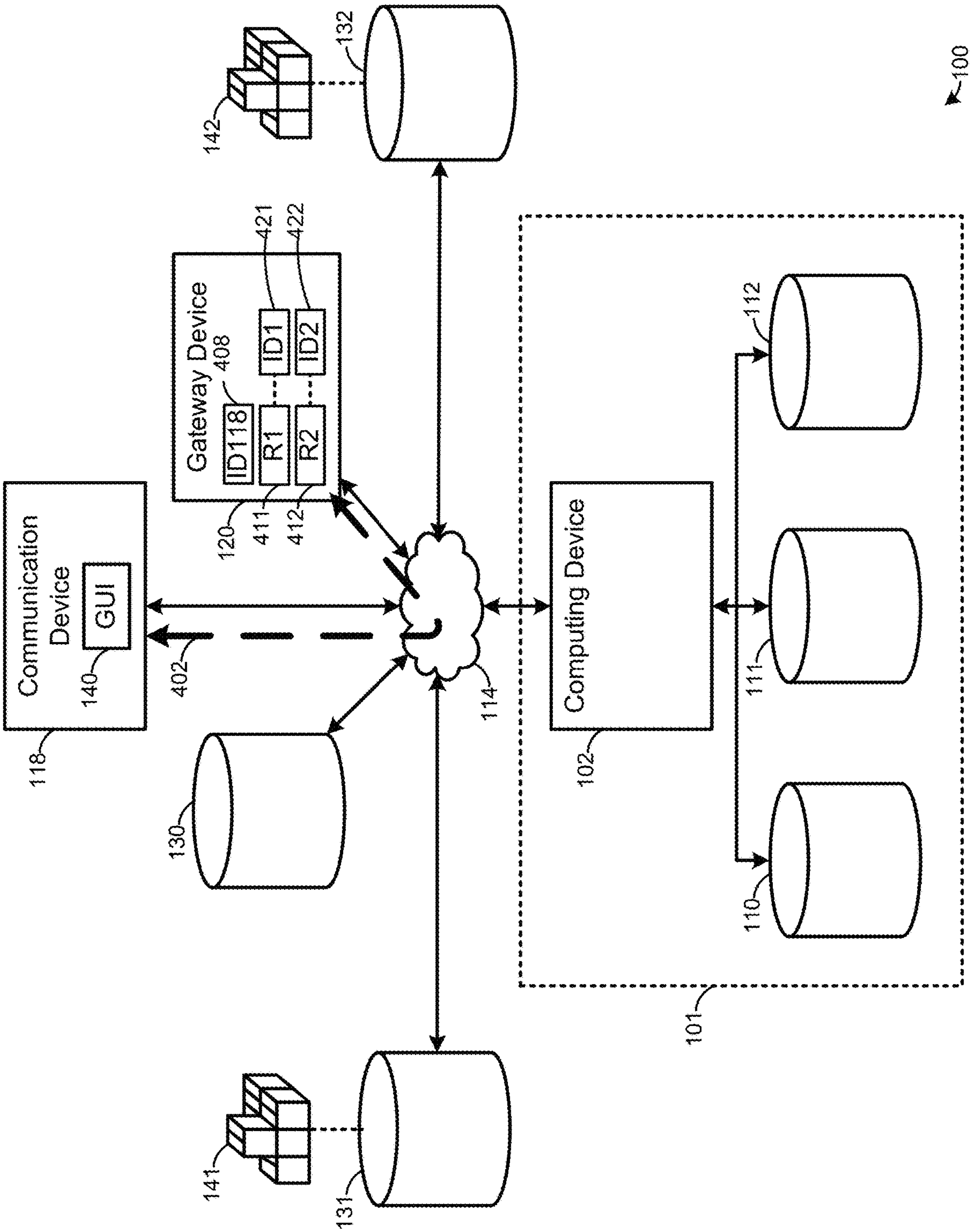
FIG. 4 depicts the system of FIG. 1 implementing aspects of method for unlocking electronic messages for database updates, according to non-limiting examples.

With attention first directed to FIG. 4, the communication device 118 may initiate a communication session 402 with the gateway device 120. Within the communication session 402, the communication device 118 and the gateway device 120 may initiate provisioning of the resources 141, 142, for example as a combined provisioning of portions of the resources 141, 142. In particular, within the communication session 402, the communication device 118 and the gateway device 120 may communicate such that the gateway device 120 initiates provisioning of a combination of a portion of the resources 141 and a portion of the resources 142.

During the communication session 402, the gateway device 120 may receive and/or determine an identifier 408 associated with the communication device 118 (e.g., as depicted "ID118"), and generate a first record 411 representing the portion of the resources 141 to be provisioned in association with the communication device 118, and a second record 412 representing the portion of the resources 142 to be provisioned in association with the communication device 118.

The identifier 408 may comprise any suitable identifier associated with the communication device 118, including, but not limited to, a network address associated with the communication device 118, and the like.

The records 411, 412 may comprise any suitable information for identifying the respective portions of the resources 141, 142 to be provisioned, including, but not limited to, a textual description of the resources 141, 142, respective addresses at which the resources 141, 142 are to be provisioned, respective times and/or dates at which the resources 141, 142 are to be provisioned, respective costs associated with provisioning of the resources 141, 142, and the like. The records 411, 412 may further indicate a respective status of provisioning of the resources 141, 142, that may be updated as the status of provisioning of the resources 141, 142 changes.

The records 411, 412 may further comprise respective identifiers thereof, such as respective assigned provisioning identifiers that may be unique (e.g., at least in the system 100, and/or a at least until the provisioning of the resources 141, 142 is completed). Hereafter an identifier 421 of the record 411, and/or resources 141 identified in the record 411 will be referred to as "ID1", and an identifier 422 of the record 412, and/or resources 142 identified in the record 412 will be referred to as "ID2". The identifiers 421, 422 are depicted in association with respective records 411, 412 in FIG. 4 via broken lines therebetween. This convention will be used throughout the present specification. Furthermore, while for simplicity the identifiers 421, 422 are not depicted in each depiction of the records 411, 412 herein, they are nonetheless understood to be present. Furthermore, it is understood that that the communication device 118 may be provided with copies of the records 411, 412 and/or the identifiers 421, 422 during the communication session 402.

While not depicted, the records 411, 412 may further comprise an identifier of the gateway device 120.

Furthermore, while for clarity the identifier 408 is depicted as being separate from the records 411, 412, in other examples, the records 411, 412 may incorporate the identifier 408.

While not depicted, the gateway device 120 may communicate respective records 411, 412 (e.g., and optionally the identifier 408) to respective computing devices (e.g., associated with respective resource provisioners) for provisioning the resources 141, 142 to persons and/or locations and/or electronic components, and such computing devices may process the records 411, 412 to perform the provisioning according to the information in the records 411, 412.

For example, the gateway device 120 may communicate the record 411 (e.g., and optionally the identifier 408) to a computing device associated with the resources 141 and the database 131 such that the provisioning of the portion of the resources 141, as represented by the record 411, and associated with the communication device 118, may occur.

Similarly, the gateway device 120 may communicate the record 412 (e.g., and optionally the identifier 408) to a computing device associated with the resources 142 and the database 132 such that the provisioning of the portion of the resources 142, as represented by the record 412, and associated with the communication device 118, may occur.

It is further understood that, in the communication session 402, the communication device 118 may be operated to provide remittance for the respective portions of the resources 141, 142. The status of such remittance may furthermore be indicated in the respective records 411, 412. In particular, remittance for the respective portions of the resources 141, 142 may initially be provided to the computing device 102, rather than the respective resource provisioners, and locked along with other aspects represented by the records 411, 412, until one or more certain conditions are met, as described herein.

While not depicted, in the communication session 402, the communication device 118 may be provided with a summary of the initiation of provisioning of the respective portions of the resources 141, 142.

Figure 5:
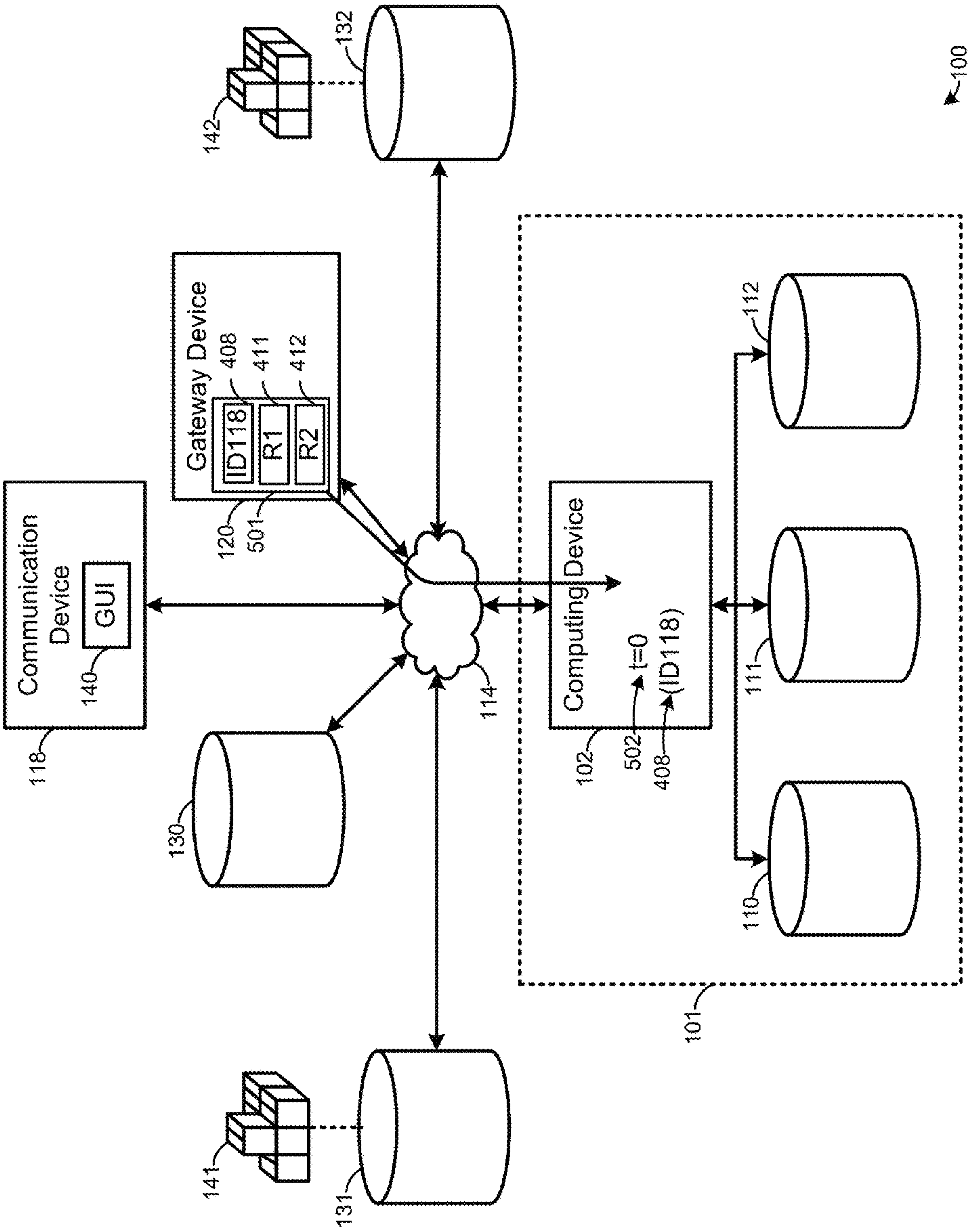
FIG. 5 depicts the system of FIG. 1 implementing further aspects of method for unlocking electronic messages for database updates, according to non-limiting examples.

Attention is next directed to FIG. 5, which depicts the gateway device 120 generating a first electronic message 501 representing a plurality of resources 141, 142, the first electronic message 501 comprising the identifier 408 and the records 411, 412 (e.g., and, while not depicted, the identifiers 421, 422). The gateway device 120 further provides the first electronic message 501 to the computing device 102 via the network 114, and the gateway device 120 receives the first electronic message 501 (e.g., at the block 302 of the method 300).

As further depicted, the gateway device 120 may further initiate one or more timers 502 (hereafter interchangeably referred to as the timers 502) associated with the identifier 408. As depicted, the timers 502 may initially be set to "0". Furthermore, while only one timer 502 is depicted, the gateway device 120 may maintain a respective timer associated with each of the records 411, 412. The timers 502 may be initiated when the first electronic message 501 is received, or the timers 502 may be respectively initiated at a respective time indicated in the records 411, 412 at which respective provisioning of the resources 141, 142 is to occur.

Figure 6:
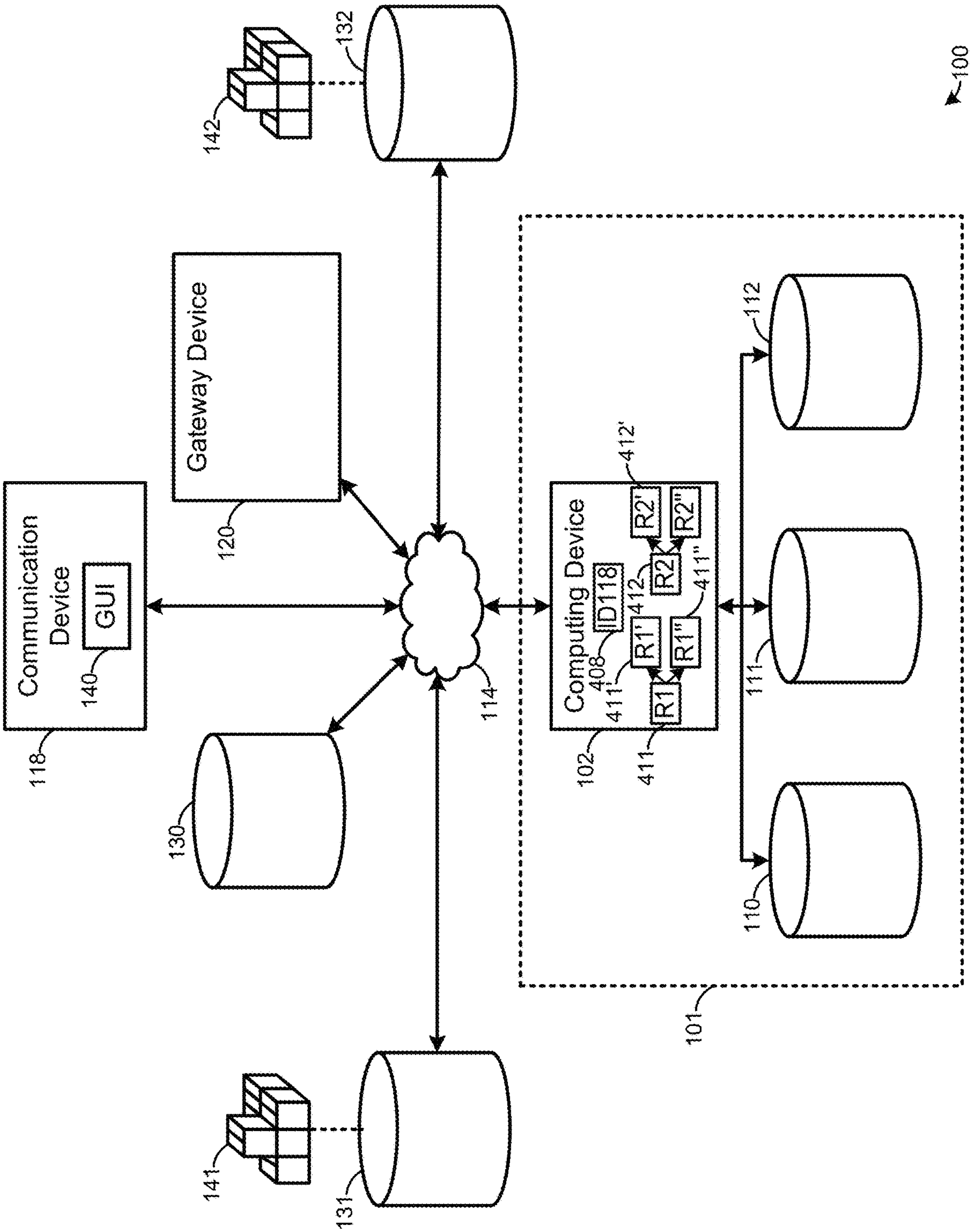
FIG. 6 depicts the system of FIG. 1 implementing yet further aspects of method for unlocking electronic messages for database updates, according to non-limiting examples.

Attention is next directed to FIG. 6, which depicts the gateway device 120 processing the records 411, 412. While the timers 502 are not depicted they may nonetheless be present and/or the gateway device 120 may be maintaining the timers 502.

As depicted, the computing device 102 may generate, from the record 411, two related records 411', 411", the first related record 411' associated with the database 131 and/or a resource provisioner associated with the resources 141, and the second related record 411" associated with the gateway device 120 and/or the database 130 and/or the resource provisioning gateway entity. Put another way, the first related record 411' associated with the database 131 may comprise a record that is to be stored at the database 131 when the resources 141 represented by the record 411 are provisioned, and the second related record 411" associated with the database 131 may comprise a record that is to be stored at the database 130 when the resources 141 represented by the record 411 are provisioned.

For example, the first related record 411' may comprise the information from the record 411, but with a remittance adjusted to indicate a respective remittance that is to be provided to the resource provisioner associated with the database 131 and/or the resources 141. Similarly, the second related record 411" may comprise the information from the record 411, but with a remittance adjusted to indicate a respective remittance that is to be provided to the resource provisioning gateway entity associated with the database 130, for example for initiating the provisioning of the resources 141. However, the records 411', 411" may comprise any suitable subset of information from the record 411.

Furthermore, the records 411', 411" are understood to include the identifier 421.

Similarly, as depicted, the computing device 102 may generate, from the record 412, two related records 412', 412", the first related record 412' associated with the database 132 and/or the resource provisioner associated with the resources 142, and the second related record 412" associated with the gateway device 120 and/or the database 130 and/or the resource provisioning gateway entity. Put another way, the first related record 412' associated with the database 132 may comprise a record that is to be stored at the database 132 when the resources 142 represented by the record 412 are provisioned, and the second related record 412" associated with the database 132 may comprise a record that is to be stored at the database 130 when the resources 142 represented by the record 412 are provisioned.

For example, the first related record 412' may comprise the information from the record 412, but with a remittance adjusted to indicate a respective remittance that is to be provided to the resource provisioner associated with the database 132 and/or the resources 142. Similarly, the second related record 412" may comprise the information from the record 412, but with a remittance adjusted to indicate a respective remittance that is to be provided to the resource provisioning gateway entity associated with the database 130, for example for initiating the provisioning of the resources 142. However, the records 412', 412" may comprise any suitable subset of information from the record 412.

Furthermore, the records 412', 412" are understood to include the identifier 422.

Furthermore, in some examples, generation of the records 411', 411", 412', 412" may be optional.

Figure 7:
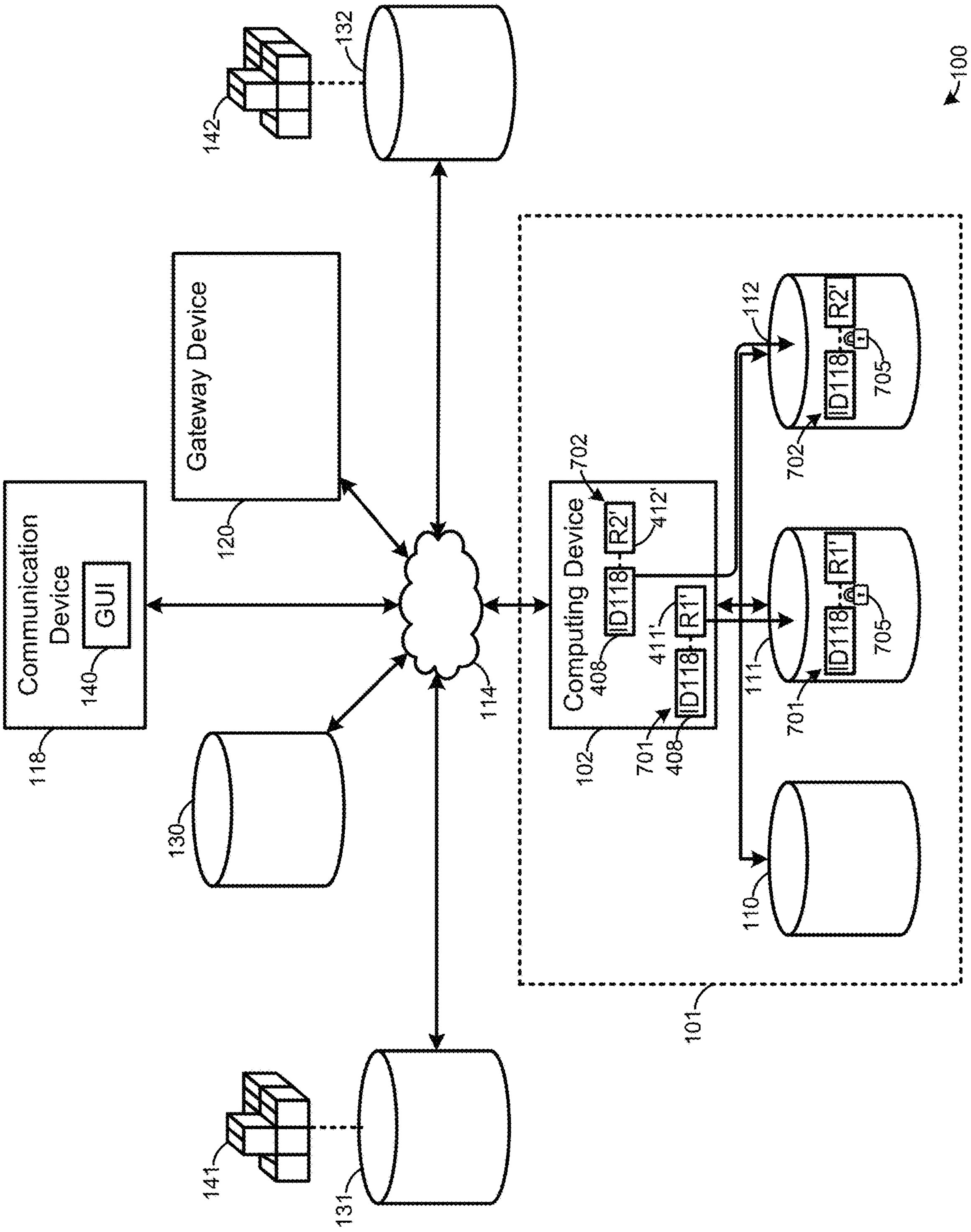
FIG. 7 depicts the system of FIG. 1 implementing yet further aspects of method for unlocking electronic messages for database updates, according to non-limiting examples.

Attention is next directed to FIG. 7, which depicts the computing device 102 generating (e.g., at the block 304) a plurality of second electronic messages 701, 702 corresponding to the plurality of resources 141, 142 represented by the first electronic message 501, each of the plurality of second electronic messages 701, 702 representing a respective resource 141, 142 (or a portion thereof), of the plurality of resources 141, 142.

For example, the second electronic message 701 comprises the identifier 408 in association with the first related record 411', such association indicated via a dashed line therebetween. Similarly, the second electronic message 702 comprises the identifier 408 in association with the first related record 412'.

Furthermore, the second electronic messages 701, 702 may be in a format of a database entry.

As further depicted in FIG. 7, the computing device 102 stores (e.g., at the block 306 of the method 300) the plurality of second electronic messages 701, 702 at respective databases 111, 112 associated with respective resource provisioning, the plurality of second electronic messages 701, 702 initially locked at the respective databases 111, 112, as indicated by a "lock" icon 705.

As used herein, the term "locked" is understood to include database entries being stored at a database until unlocked. Put another way, a database entry being locked may prevent the database entry from being released to another database. Similarly, a database entry being locked may prevent the database entry, or specific portions thereof, from being changed. For example in some instances, all the information of a database entry may be prevented from being changed when locked, including, but not limited to, an indication of associated remittance, though a status, and the like, of provisioning of a respective resource may be changed with a database entry is locked. For example, a status of the provisioning of a respective resource may be other than "not provisioned" or "provisioned"; indeed, other types of status may include, but are not limited to, "provisioning being processed", "complaint logged", "delivered", and the like. Such examples illustrate that the computing device 102 may receive and/or determine provisioning status updates from one or more of the gateway device 120, the communication device 118, and computing devices operated by entities that provision the resources 141, 142, and update the records 411', 412' accordingly with the status updates.

While for simplicity, the identifier 408 and the records 411', 412' are not provided with reference numbers in the messages 701, 702 as stored in the databases 111, 112, they are nonetheless understood to be present via the respective labels "ID118", "R1", "R2'". This convention will be used throughout the present specification.

Figure 8:
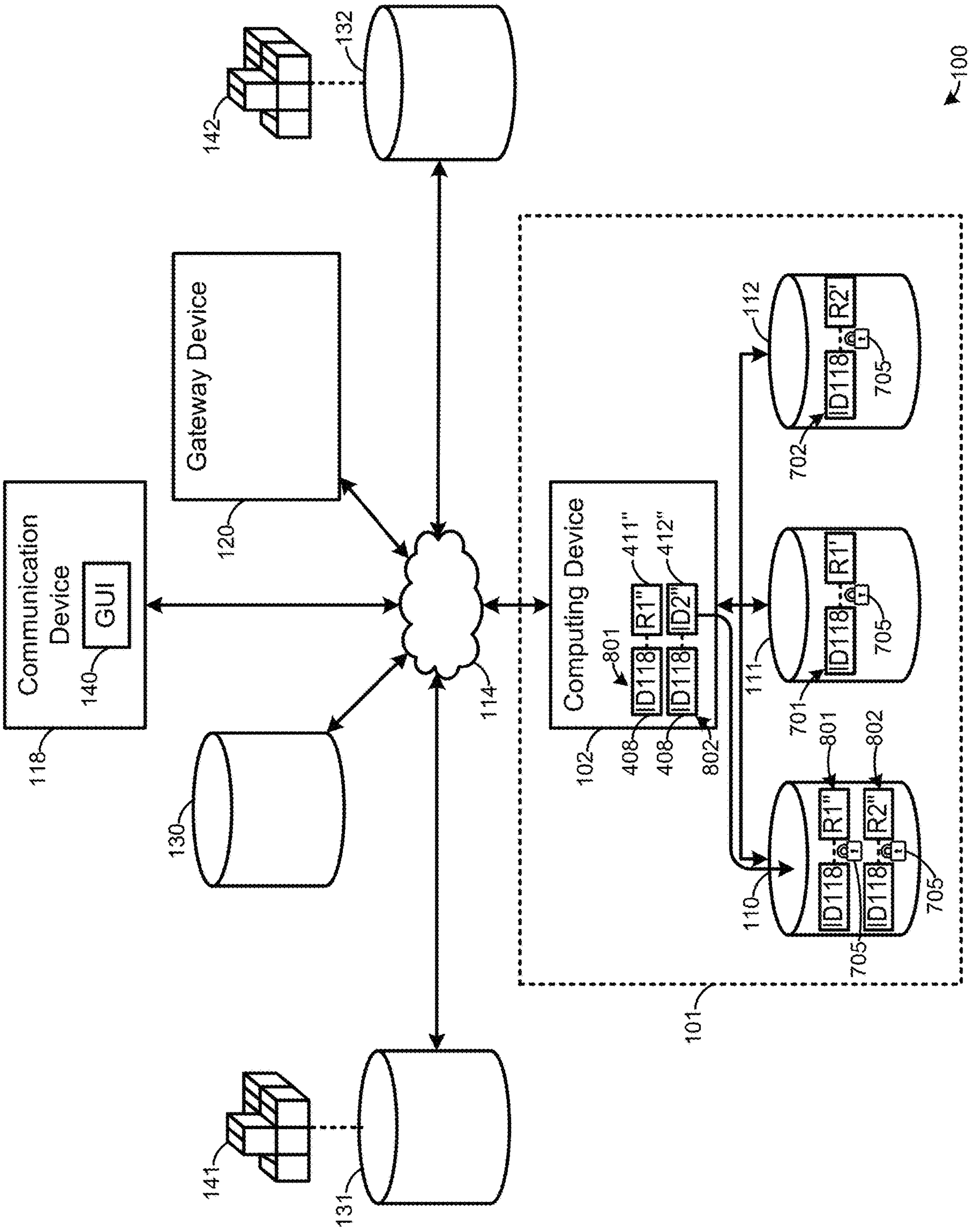
FIG. 8 depicts the system of FIG. 1 implementing yet further aspects of method for unlocking electronic messages for database updates, according to non-limiting examples.

Attention is next directed to FIG. 8, which depicts the computing device 102 optionally generating a plurality of second electronic messages 801, 802, respectively comprising the identifier 408 in association with the second related record 411", and the identifier 408 in association with the second related record 412".

Furthermore, the second electronic messages 801, 802 may be in a format of a database entry.

As further depicted in FIG. 8, the computing device 102 stores the plurality of second electronic messages 801, 802 at the database 110 associated with the gateway device 120. The plurality of second electronic messages 801, 802 are also initially locked at the database 110, as indicated by the "lock" icon 705.

It is further understood that a status of a respective provisioning of respective resources may also be updated at the second electronic messages 801, 802, as described with respect to the second electronic messages 701, 702.

Figure 9:
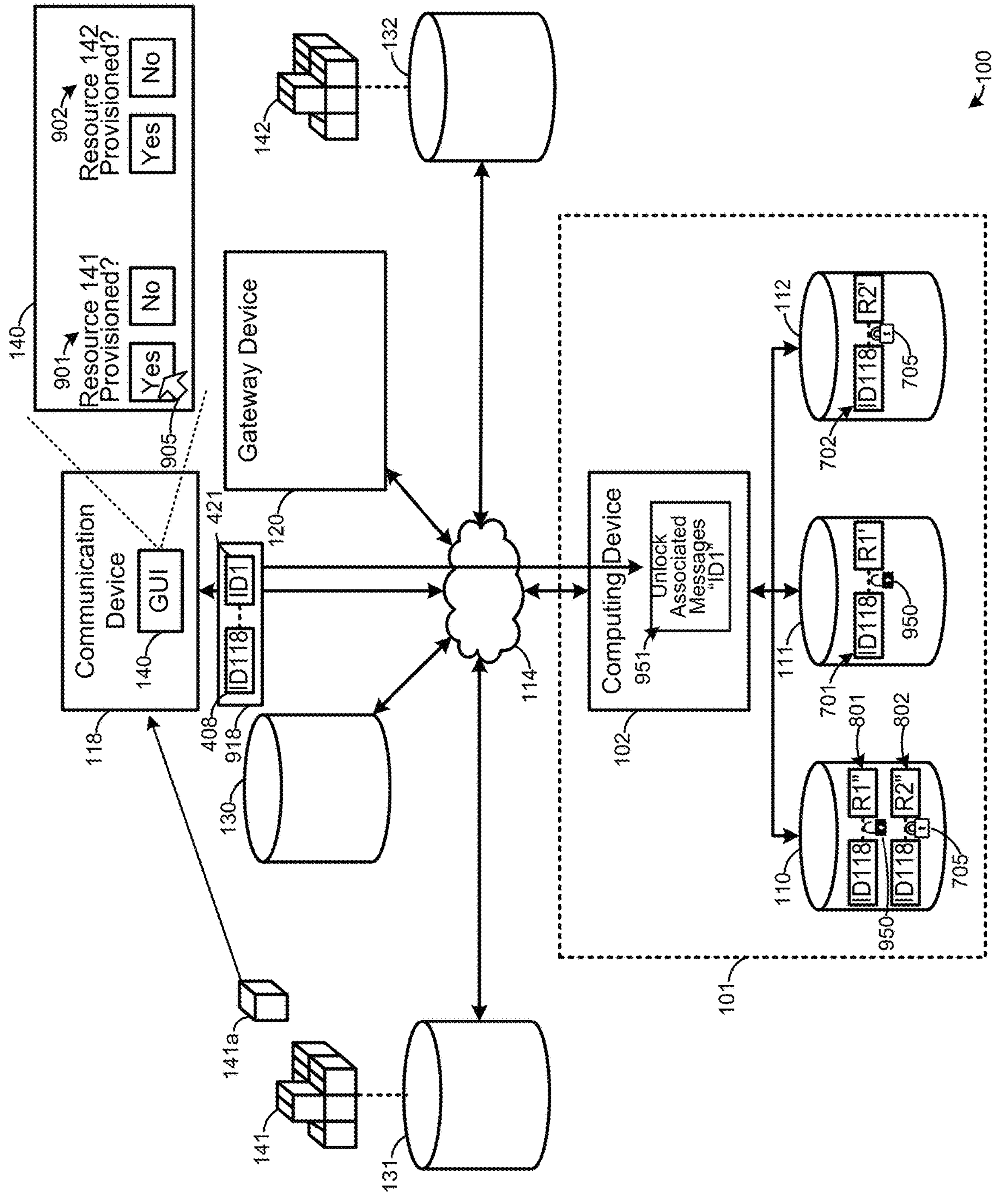
FIG. 9 depicts the system of FIG. 1 implementing yet further aspects of method for unlocking electronic messages for database updates, according to non-limiting examples.

Attention is next directed to FIG. 9, where successful provisioning of a portion 141*a* of the resources 141 occurs. In particular, as depicted, the portion 141*a* of the resources 141, corresponding to a portion of the resources 141 indicated by the record 411. While the provisioning of the portion 141*a* of the resources 141 is represented in FIG. 9 by the portion 141*a* of the resources 141 being provided to the communication device 118, it is understood that provisioning of the portion 141*a* of the resources 141 may be to one or more of persons and/or locations and/or electronic components, and the like, associated with the communication device 118. Such provisioning of the portion 141*a* of the resources 141 may include, but is not limited to, a person associated with the communication device 118 travelling (e.g., with or without the communication device 118) to a location where the resources 141 are located, and being provided with the portion 141*a* of the resources 141.

As depicted, the communication device 118 may be operated to interact with the GUI 140 to indicate whether, or not the portion 141*a* of the resources 141 was provisioned.

Alternatively, or in addition, the GUI 140 may be available at any other suitable device associated with the communication device 118.

Details of an example of the GUI 140 are depicted in FIG. 9, via dashed lines extending from the GUI 140 in the communication device 118, and the GUI 140 is furthermore understood to be provided at a display screen of the communication device 118.

It is furthermore understood that, while the GUI 140 has been depicted as being located at the communication device 118, the GUI 140 may be accessed by the communication device 118 via a browser, and the like, with the GUI 140 being provided to the communication device, via the browser, from the gateway device 120 and/or the computing device 102. For example, at, or around, a time and/or date indicated by the records 411, 412, a message may be provided to the communication device 118 that includes a link to the GUI 140, and, when the link to the GUI 140 is accessed, the GUI 140 may be provided in the browser at the communication device 118.

As depicted, the GUI 140 includes respective regions 901, 902 for respectively indicating whether or not resources 141, 142 represented by the records 411, 412 were provisioned. For example, the region 901 includes an indicator of the resources 141 (e.g., "Resources 141 Provisioned") and "Yes" and "No" electronic buttons that may be actuated via a pointer 905. In particular, actuation of the "Yes" button may indicate that the portion 141*a* of the resources 141 was provisioned, and, conversely, actuation of the "No" button may indicate that the portion 141*a* of the resources 141 was not provisioned. As depicted, the pointer is being operated to actuate the "Yes" button of the region 901.

Similarly, the region 902 includes an indicator of the resources 142 (e.g., "Resources 142 Provisioned") and "Yes" and "No" electronic buttons that may be actuated via the pointer 905. In particular, actuation of the "Yes" button may indicate that the portion 142*a* of the resources 142 was provisioned, and, conversely, actuation of the "No" button may indicate that the portion 142*a* of the resources 142 was not provisioned. As depicted, the pointer 905 is not being used to actuate either button of the region 902.

Returning to the region 901, as the pointer 905 is being used to actuate the "Yes" button of the region 901, the communication device 118 generates a confirmation 918 that the portion 141*a* of the resource 141 has been provisioned, and provides the confirmation 918 to the computing device 102. As depicted, the confirmation 918 comprises the identifier 408 associated with the communication device 118 and the identifier 421 of the record 411, and/or resources 141 identified in the record 411.

Indeed, it is understood that the GUI 140 may comprise a GUI programmed to generate the confirmation 918 when the "Yes" button of the region 901 is actuated, and the "Yes" button may be associated with the identifiers 408, 421. Similarly, the GUI 140 may comprise a GUI programmed to generate a complaint, and the like, that resources 141 were not provisioned when the "No" button of the region 901 is actuated, and the "No" button may be associated with the identifiers 408, 421. Similarly, the GUI 140 may comprise a GUI programmed to generate a confirmation that resources 142 were provisioned when the "Yes" button of the region 902 is actuated, and the "Yes" button may be associated with the identifiers 408, 422. Similarly, the GUI 140 may comprise a GUI programmed to generate a complaint, and the like, that resources 142 were not provisioned when the "No" button of the region 901 is actuated, and the "No" button may be associated with the identifiers 408, 422. When received at the computing device 102, such confirmations or complaints may trigger certain actions at the computing device 102, as described herein.

For example, the computing device 102 receives (e.g., at the block 308 of the method 300) the confirmation 918 and, in response, unlocks (e.g., also at the block 308 of the method 300), respective second electronic messages 701, 801, as represented by the "lock" icons 705 associated with the respective second electronic messages 701, 801 changing to an "unlocked lock" icon 950. For example, in response to receiving the confirmation 918, the computing device 102 may generate a command 951 to unlock electronic messages associated with the identifier 421 (e.g., "ID1") and provide the command 951 to the databases 110, 111, 112, such that electronic messages associated with the identifier 421, stored in the databases 110, 111, 112, are unlocked.

While not depicted, status of the resources 141 indicated in the records 411', 411" may change from "not provisioned" to "provisioned".

Figure 10:
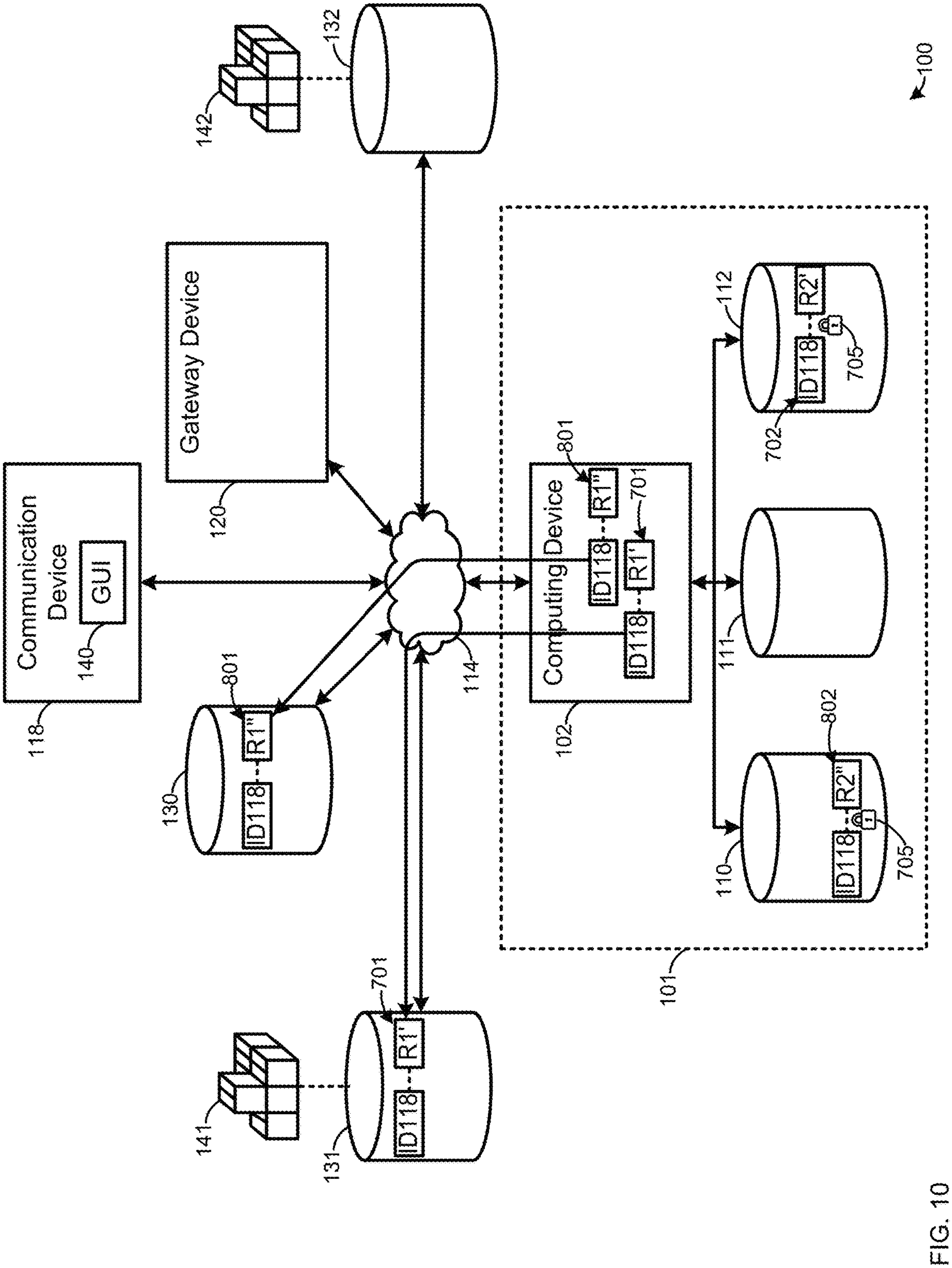
FIG. 10 depicts the system of FIG. 1 implementing yet further aspects of method for unlocking electronic messages for database updates, according to non-limiting examples.

Attention is next directed to FIG. 10, which depicts the computing device 102 delivering (e.g., at the block 310) the unlocked second electronic messages 701, 801 to respective external databases 130, 131 associated with the respective resource provisioning shown in FIG. 9.

As further depicted in FIG. 10, the unlocked second electronic messages 701, 801 are no longer stored at the databases 110, 111 however, in other examples, the unlocked second electronic messages 701, 801 may remain stored at the databases 110, 111, but with a status changed to "delivered" and the like.

It is further understood that receipt of unlocked second electronic messages 701, 801 at respective databases 110, 111 may result in remittance indicated in the unlocked second electronic messages 701, 801 being provided to the respective entities associated with the resources 141 and the gateway device 120 (e.g., a resource provisioner and a resource provisioning gateway entity).

Figure 11:
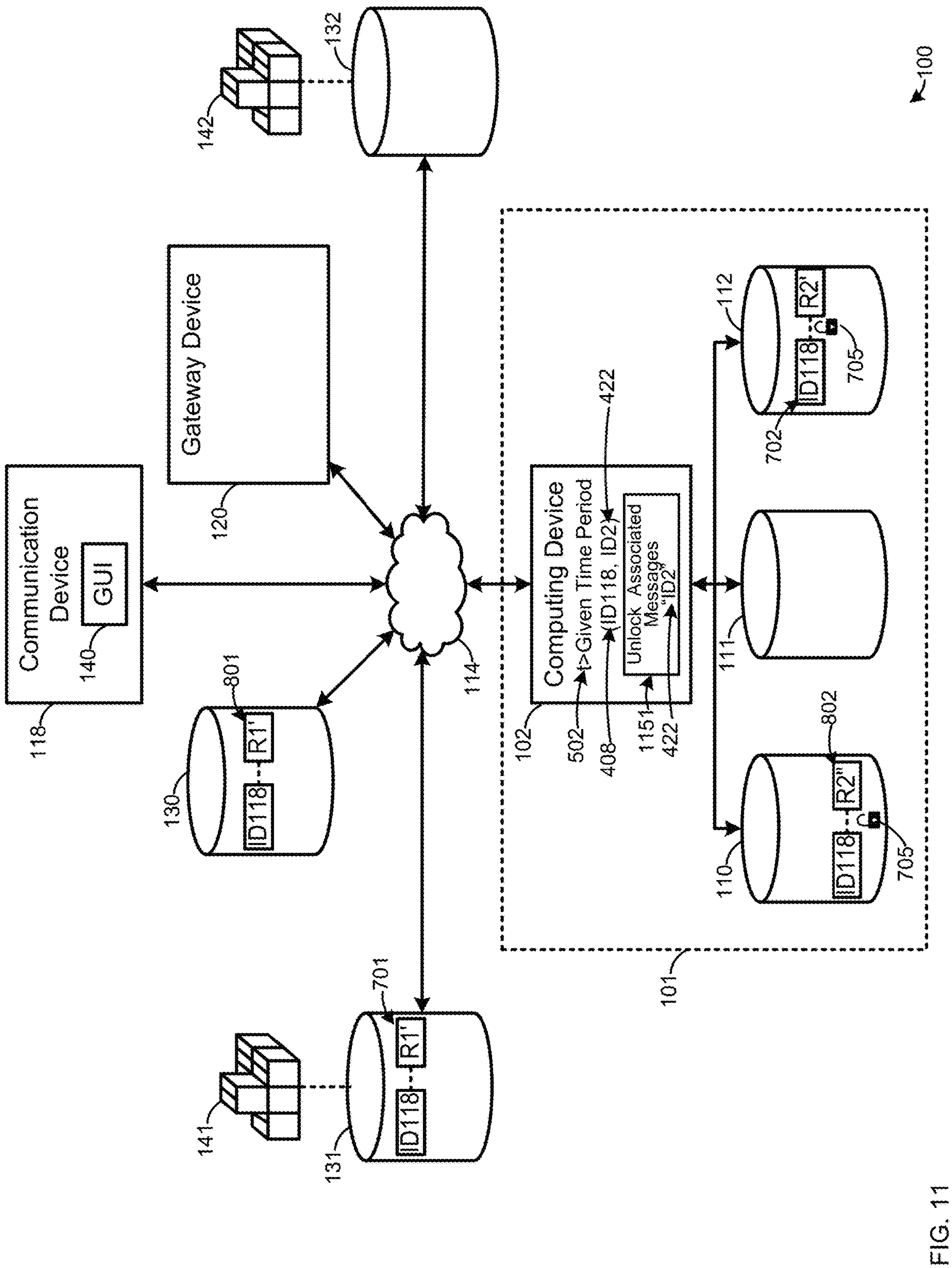
FIG. 11 depicts the system of FIG. 1 implementing yet further aspects of method for unlocking electronic messages for database updates, according to non-limiting examples.
Figure 12:
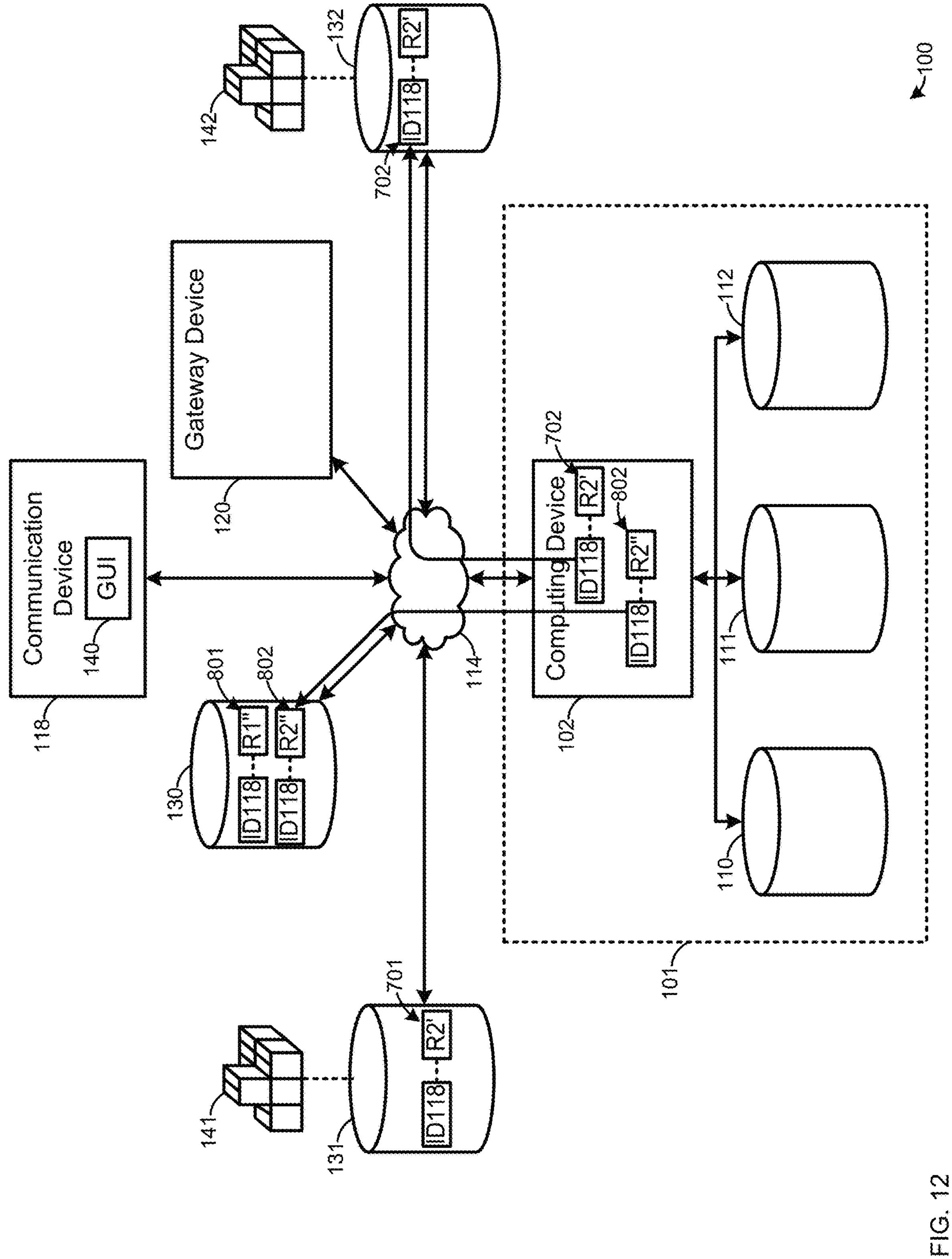
FIG. 12 depicts the system of FIG. 1 implementing yet further aspects of method for unlocking electronic messages for database updates, according to non-limiting examples.

Attention is next directed to FIGS. 11 and 12, which depicts another example of the blocks 308, 310 of the method 300.

In particular, it is understood that FIG. 11 and FIG. 12 follow, in time, from FIG. 10. In this example, details of the GUI 140 are not depicted as, in this example, no confirmation of the resources 142 being provisioned is received at the computing device 102 from the communication device 118 and/or via the GUI 140. For example, provisioning of the resources 142 may have occurred, but the GUI 140 was not operated to select the "YES" button from the region 902.

However, in FIG. 11, the timer 502 is again depicted, and it is understood that, in this example, the timer 502 is further associated with the identifier 422, and hence provisioning of the resources 142. As depicted, the timer 502 indicates that a given time period has been exceeded (e.g., via "t>Given Time Period").

As also depicted in FIG. 11, it is understood that after the given time period, the computing device 102 unlocks (e.g., at the block 308 of the method 300), respective second electronic messages 702, 802, as represented by the "lock" icons 705 associated with the respective second electronic messages 702, 802 changing to an "unlocked lock" icon 950. For example, the computing device 102 may generate a command 1151 to unlock electronic messages associated with the identifier 422 (e.g., "ID2") and provide the command 1151 to the databases 110, 111, 112, such that electronic messages associated with the identifier 422, stored in the databases 110, 111, 112, are unlocked.

While not depicted, status of the resources 142 indicated in the records 412', 412" may change from "not provisioned" to "provisioned".

Attention is next directed to FIG. 12, which depicts the computing device 102 delivering (e.g., at the block 310) the unlocked second electronic messages 702, 802 to respective external databases 130, 132 associated with the respective provisioning of the resources 142.

As further depicted in FIG. 12, the unlocked second electronic messages 702, 802 are no longer stored at the databases 110, 112 however, in other examples, the unlocked second electronic messages 702, 802 may remain stored at the databases 110, 112, but with a status changed to "message delivered" and the like.

It is further understood that receipt of unlocked second electronic messages 702, 802 at respective databases 110, 112 may result in remittance indicated in the unlocked second electronic messages 702, 802 being provided to the respective entities associated with the resources 142 and the gateway device 120 (e.g., a resource provisioner and a resource provisioning gateway entity).

Figure 13:
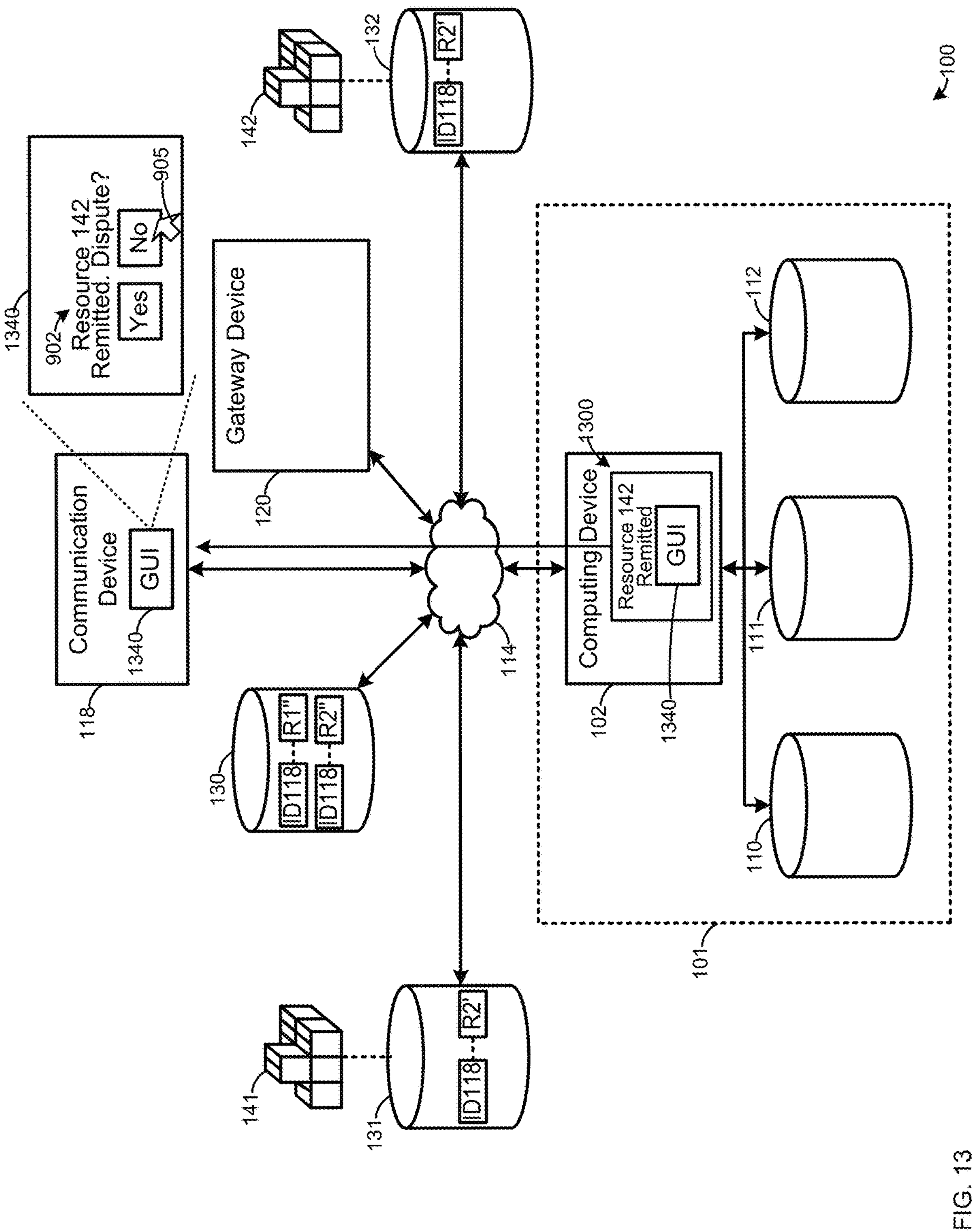
FIG. 13 depicts the system of FIG. 1 implementing yet further aspects of method for unlocking electronic messages for database updates, according to non-limiting examples.

Attention is next directed to FIG. 13, which is understood to follow, in time, from FIG. 12. In particular, FIG. 13 depicts the computing device 102 providing, to the communication device 118, a message 1300 indicating that remittance has occurred for the resources 142. As depicted message 1300 may include a GUI 1340 that, as depicted, may be interacted with at the communication device 118. While not depicted, the message 1300 and/or the GUI 1340 may include the identifier 422.

As depicted, the GUI 1340 includes text "Resources 142 Remitted. Dispute?", with an electronic button "Yes" that, when actuated, causes the GUI 1340 to generate a message (not depicted) and/or complaint to the gateway device 120 and/or the computing device 102 that disputes that the respective provisioning of the resources 142 has occurred. Put another way, provisioning of the resources 142 may not have occurred, but a remittance for the resources 142 nonetheless occurred, and actuation of the electronic button "Yes" may initiate an electronic dispute resolution process.

Conversely, the GUI 1340 further comprises an electronic button "No" that, when actuated, causes the GUI 1340 to generate a message (not depicted) to the gateway device 120 and/or the computing device 102 that confirms that the respective provisioning of the resources 142 occurred. As depicted, the pointer 905 is being used to actuate the "No" electronic button.

Figure 14:
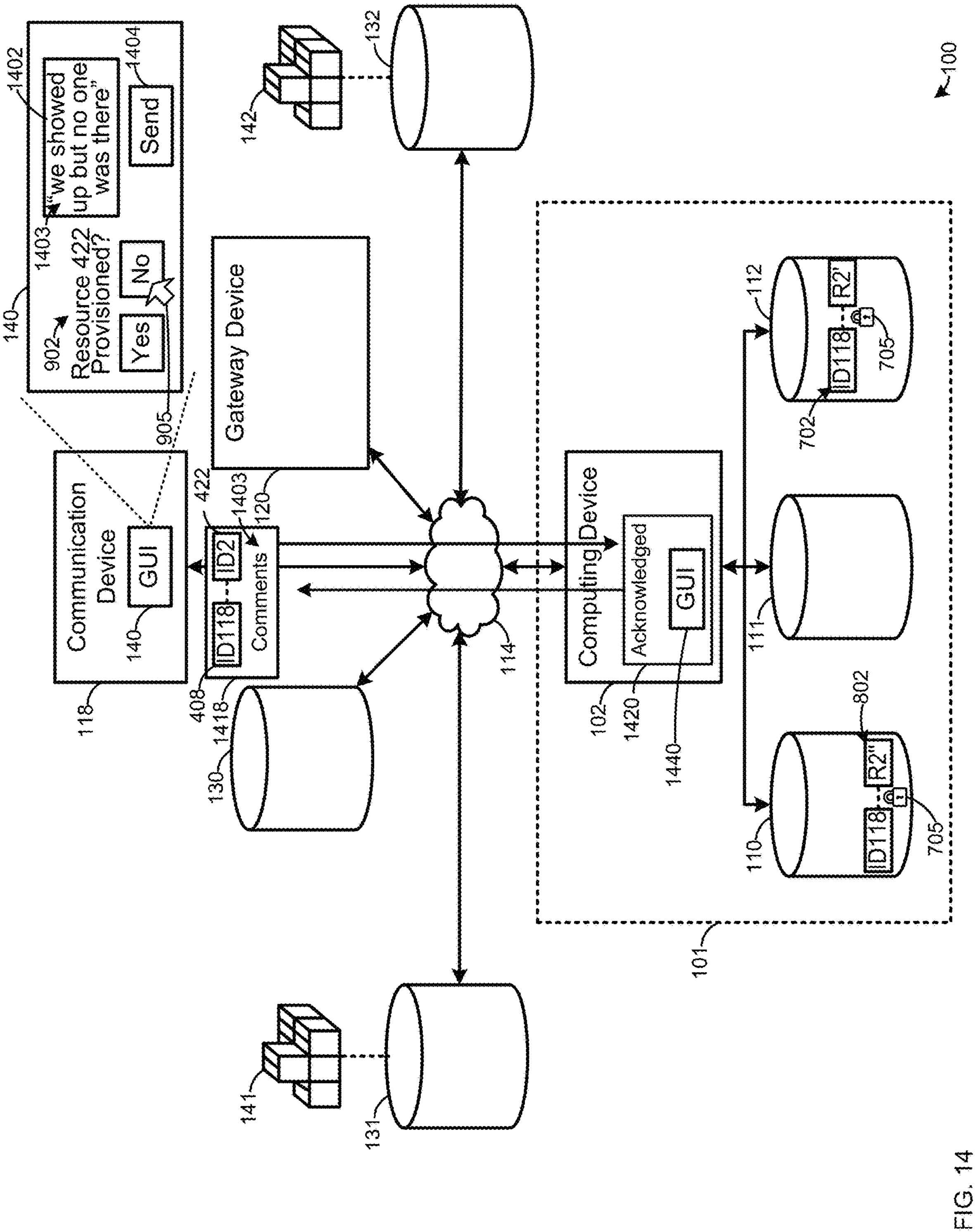
FIG. 14 depicts the system of FIG. 1 implementing yet further aspects of method for unlocking electronic messages for database updates, according to non-limiting examples.
Figure 15:
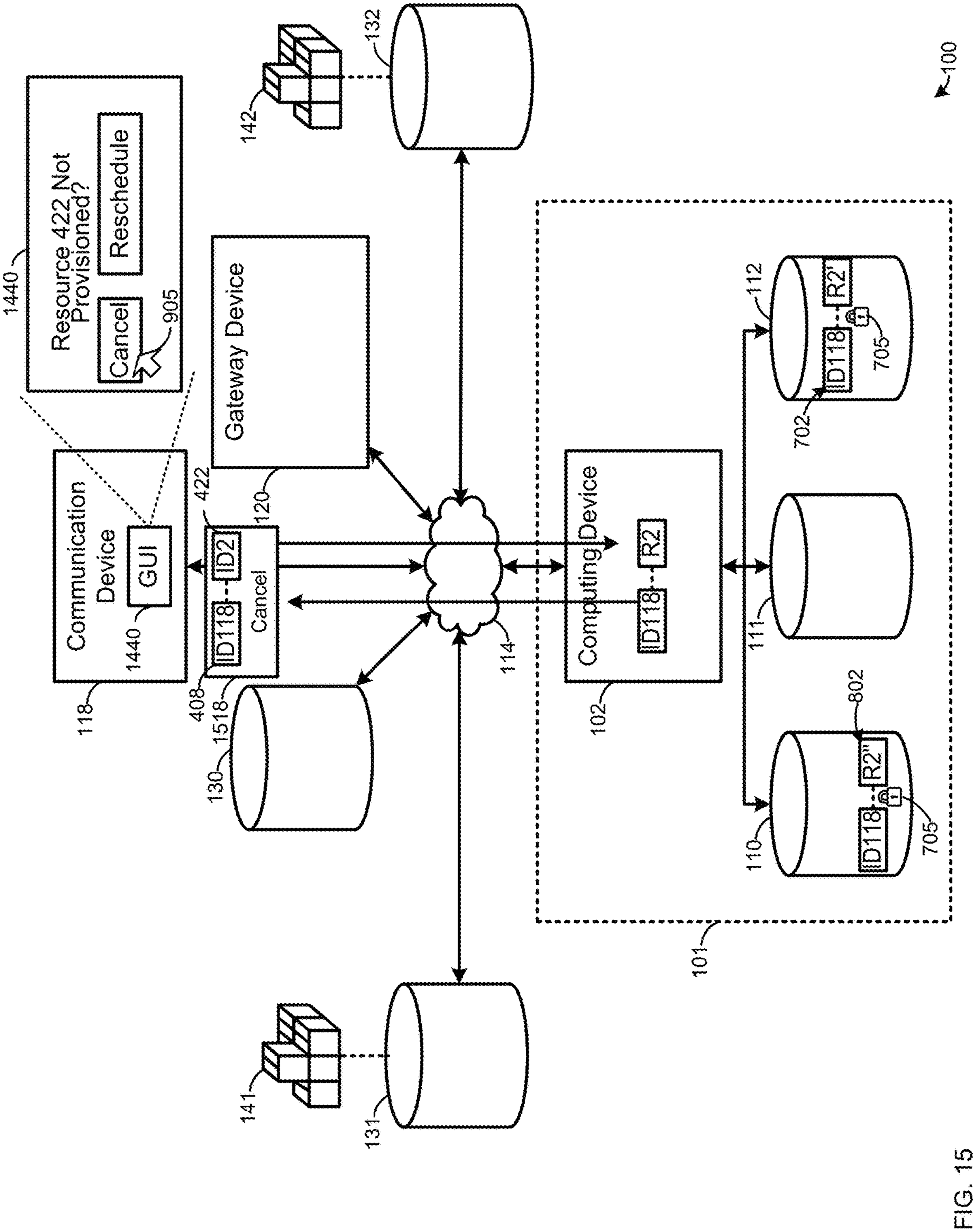
FIG. 15 depicts the system of FIG. 1 implementing yet further aspects of method for unlocking electronic messages for database updates, according to non-limiting examples.

Attention is next directed to FIG. 14 and FIG. 15 which depicts an example of the GUI 140 being operated to indicate that the resources 142 (and/or a portion thereof) was not provisioned. For example, the example of FIG. 14 and FIG. 15 may occur with the given time period of the example of FIG. 11 and/or in place of the example of FIG. 11 to FIG. 13. It is further understood that the example of FIG. 14 and FIG. 15 may follow in time from FIG. 10.

In particular, the example of FIG. 14 and FIG. 15 is understood to occur when the resources 142 associated with the record 412 were not provisioned, but the resources 141 associated with the record 411 were provisioned. As such, the GUI 140 is modified (e.g., within a browser, and the like, in response to the "Yes" button or the "No" button of the region 901 being actuated), to remove the region 901, such that the region 902 remains. In this example, the "No" button of the region 902 is actuated via the pointer 905.

With attention next directed to FIG. 15, actuation of the "No" button of the region 902 may causes a text box 1402 to be generated at the region 902 into which comments 1403 may be added regarding the non-provisioning of the resources 142, the comments 1403 added using an input device of the communication device 118. In particular, as depicted the comments 1403 in the text box 1402 comprise "we showed up but no one was there".

Furthermore, as depicted, actuation of the "No" button of the region 902 may further cause a "Send" electronic button 1404 that may be actuated after the comments 1403 are added, for example via the pointer 905. As depicted, in response to the "Send" electronic button 1404 being actuated, the GUI 140 generates a complaint 1418 that the portion **142*a* of the resources 142 has not been provisioned, and provides the complaint 1418 to the computing device 102. As depicted, the complaint 1418 comprises the identifier 408 associated with the communication device 118, the identifier 422 of the record 412, and/or resources 142 identified in the record 412, and the comments 1403**.

Alternatively, the text box 1402 and the "Send" electronic button 1404 may not be generated, and the complaint 1418 may be generated when the "No" electronic button of the region 902 is actuated though, in this example, the complaint 1418 is generated without the comments 1403.

The computing device 102 receives, within the given time period (e.g., of the example of FIG. 11), via the GUI 140, the complaint 1418, which may comprise an indication that the given respective resource 142 was not provisioned.

In response, as depicted, the computing device 102 transmits, to the communication device 118 (e.g., associated with generation of the first electronic message 501) a third electronic message 1420 acknowledging that the given respective resource was not provisioned. The third electronic message 1420 is understood to be a "third" electronic message relative to the first electronic message 501 and the second electronic messages 701, 701, 801, 802.

As depicted, the third electronic message 1420 optionally includes a respective GUI 1440 for providing one or more selectable options for managing the given respective resource 142 that was not provisioned.

For example, attention is next directed to FIG. 15 which shows details of the GUI 1440. As depicted, the GUI 1440 comprises a "Cancel" electronic button and a "Reschedule" electronic button. Such electronic buttons represent one or more selectable options for managing the given respective resource 142 that was not provisioned.

Actuation of the "Cancel" button, for example, as depicted via the pointer 905, may cause the GUI 1440 to generate a message 1518 to the computing device 102 that, when received at the computing device 102, causes the computing device 102 to cancel provisioning of the portion

142*a* of the resources 142. For example, while not depicted, the messages 702, 802 may be unlocked and processed to cause any remittance associated with the messages 702, 802 to be returned to the communication device 118, in any suitable manner. A status of the messages 702, 802 may optionally be updated accordingly to, for example, "cancelled".

In contrast, actuation of the "Reschedule" button, for example via the pointer 905, may cause the GUI 1440 to generate a message to the computing device 102 that, when received at the computing device 102, causes the computing device 102 to update a time and/or date for provisioning of the portion 142*a* of the resources 142 at the messages 702, 802 and/or reset the timer 502 in accordance with the updated time and/or date. While not depicted, actuation of the "Reschedule" button may cause the GUI 1440 to provide any suitable further input controls for rescheduling provisioning of the portion 142*a* of the resources 142, such as enabling entering of an updated time and/or date. For example, when provisioning of the resources comprises a person travelling to a location where the resources 142 are located, and being provided with a portion of the resources 142, such input controls may enable entry of a time and/or date of arrival at the location.

Attention is now directed to FIG. 16 which depicts a flowchart representative of a method 1600 for adjusting electronic messages from different regions. The operations of the method 1600 of FIG. 16 correspond to machine readable instructions that may be executed by the computing device 102, and specifically the controller 202 of the computing device 102, or a combination of computing devices 102 and respective controllers thereof. In the illustrated example, the instructions represented by the blocks of FIG. 16 are stored at the memory 204 for example, as the application 206. The method 1600 of FIG. 16 is one way in which the system 100 and/or the computing device 102 may be configured. Furthermore, the following discussion of the method 1600 of FIG. 16 will lead to a further understanding of the system 100, and its various components.

The method 1600 of FIG. 16 need not be performed in the exact sequence as shown and likewise various blocks may be performed in parallel rather than in sequence. Accordingly, the elements of method 1600 are referred to herein as "blocks" rather than "steps." The method 1600 of FIG. 16 may be implemented on variations of the system 100 as well.

At a block 1602, the controller 202 and/or the computing device 102, accumulates a plurality of first electronic messages, that may include the first electronic message 501, the plurality of first electronic messages associated with a first originating region.

At a block 1604, the controller 202 and/or the computing device 102, accumulates a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums.

For example, the system 100 may comprise a plurality of computing devices 102 associated with different regions, and the computing devices 102 of the different regions may accumulate respective first messages from communication devices in the different regions, the first messages associated with resources in a region that is different from a respective region in which the first messages originated. Such computing devices 102 of the different regions may be in communication via the network 114.

For example, the first electronic messages of the block 1602 may be from communication devices associated with the first originating region, but for provisioning of resources in the second originating region, and the further first electronic messages of the block 1604 may be from communication devices associated with the second originating region, but for provisioning of resources in the first originating region. Put another way, persons associated with communication devices associated with the first originating region may be traveling to the second originating region to access resources located in the second originating region, and, conversely, persons associated with communication devices associated with the second originating region may be traveling to the first originating region to access resources located in the first originating region.

Furthermore, the first originating region and the second originating region associated with different respective remittance mediums, such as different currencies, and the like.

At a block 1606, the controller 202 and/or the computing device 102, compares respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same.

For example, respective remittances associated unlocked first electronic messages may be accumulated, and respective remittances associated unlocked further first electronic messages may be accumulated, and the accumulated remittances may be compared to find groups of accumulated remittances that are about the same or equal.

At a block 1608, the controller 202 and/or the computing device 102 delivers the accumulated respective first remittances to the respective external databases associated with the first resources associated with the first originating region associated with the accumulated respective further first remittances of the unlocked further first electronic messages.

At a block 1610, the controller 202 and/or the computing device 102 delivers the accumulated respective further first remittances to the respective external databases associated with the second resources associated with the second originating region associated with the accumulated respective further first remittances of the unlocked further first electronic messages.

Put another way, at the block 1608 and the block 1610, rather than transfer remittances being the different regions, remittances accumulated in association with the first originating region, but that are associated with resources of the second originating region, are used to cover the remittances accumulated in association with the second originating region, but that are associated with resources of the first originating region. Similarly, remittances accumulated in association with the second originating region, but that are associated with resources of the first originating region, are used to cover the remittances accumulated in association with the first originating region, but that are associated with resources of the second originating region.

It is further understood that accumulating of the plurality of first electronic messages and the plurality of further first electronic messages may occur for a respective given time period, such as a day and/or a week and/or a month, amongst other possibilities.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, generate LLM responses, cannot operate machine learning feedback loops, among other features and functions set forth herein).

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

Furthermore, descriptions of one processor and/or controller and/or device and/or engine, and the like, configured to perform certain functionality is understood to include, but is not limited to, more than one processor and/or more than one controller and/or more than one device and/or more than one engine, and the like performing such functionality.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

receiving, at a computing device, a first electronic message representing a plurality of resources, the first electronic message comprising a plurality of records each representing a respective resource to be provisioned;

generating, via the computing device, a plurality of second electronic messages in a format of database entries corresponding to the plurality of resources represented by the first electronic message, each of the plurality of second electronic messages representing a respective resource, of the plurality of resources;

storing, via the computing device, the plurality of second electronic messages at respective intermediary databases associated with respective resource provisioning, the plurality of second electronic messages initially locked at the respective intermediary databases, wherein being locked prevents release of the second electronic messages to respective external databases;

after one or more of a given time period, and receiving confirmation, via a graphic user interface (GUI), of one or more respective resources being provisioned, unlocking, via the computing device, respective second electronic messages in the respective intermediary databases; and delivering, via the computing device, unlocked second electronic messages from the respective intermediary databases to the respective external databases associated with the respective resource provisioning.

2. The method of claim 1, further comprising:

receiving, within the given time period, via the GUI, an indication that a given respective resource was not provisioned; and, in response:

transmitting a third electronic message to a communication device associated with generation of the first electronic message, the third electronic message acknowledging that the given respective resource was not provisioned.

3. The method of claim 1, further comprising:

receiving, within the given time period, via the GUI, an indication that a given respective resource was not provisioned; and, in response:

transmitting a third electronic message to a communication device associated with generation of the first electronic message, the third electronic message including a respective GUI for providing one or more selectable options for managing the given respective resource that was not provisioned.

4. The method of claim 1, wherein the respective intermediary databases comprise one respective intermediary database per resource provisioner.

5. The method of claim 1, wherein the respective intermediary databases comprise one respective intermediary database per resource provisioner and per resource provisioning gateway entity.

6. The method of claim 1, wherein the plurality of second electronic messages includes respective second electronic messages associated with a resource provisioning gateway entity.

7. The method of claim 1, further comprising: updating one or more of the plurality of second electronic messages initially locked at the respective intermediary databases with a respective provisioning status.

8. The method of claim 1, wherein a given second electronic message comprises a record of the respective resource provisioning.

9. The method of claim 1, further comprising:

accumulating a plurality of first electronic messages, including the first electronic message, the plurality of first electronic messages associated with a first originating region;

accumulating a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums;

comparing respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same; and delivering the accumulated respective first remittances to the respective external databases associated with the first resources associated with the first originating region associated with the accumulated respective further first remittances of the unlocked further first electronic messages; and delivering the accumulated respective further first remittances to the respective external databases associated with the second resources associated with the second originating region associated with the accumulated respective further first remittances of the unlocked further first electronic messages.

10. The method of claim 9, wherein accumulating of the plurality of first electronic messages and the plurality of further first electronic messages occurs for a respective given time period.

11. A computing device comprising:

at least one controller; and a non-transitory computer-readable storage medium having stored thereon program instructions that, when executed by the at least one controller, causes the at least one controller to perform a set of operations comprising:

receiving a first electronic message representing a plurality of resources, the first electronic message comprising a plurality of records each representing a respective resource to be provisioned;

generating a plurality of second electronic messages corresponding to the plurality of resources represented by the first electronic message, each of the plurality of second electronic messages representing a respective resource, of the plurality of resources;

storing the plurality of second electronic messages at respective intermediary databases associated with respective resource provisioning, the plurality of second electronic messages initially locked at the respective intermediary databases, wherein being locked prevents release of the second electronic messages to respective external databases;

after one or more of a given time period, and receiving confirmation, via a graphic user interface (GUI), of one or more respective resources being provisioned, unlocking respective second electronic messages in the respective intermediary databases; and delivering unlocked second electronic messages from the respective intermediary databases to respective external databases associated with the respective resource provisioning.

12. The computing device of claim 11, wherein the set of operations further comprises:

receiving, within the given time period, via the GUI, an indication that a given respective resource was not provisioned; and, in response:

transmitting a third electronic message to a communication device associated with generation of the first electronic message, the third electronic message acknowledging that the given respective resource was not provisioned.

13. The computing device of claim 11, wherein the set of operations further comprises:

receiving, within the given time period, via the GUI, an indication that a given respective resource was not provisioned; and, in response:

transmitting a third electronic message to a communication device associated with generation of the first electronic message, the third electronic message including a respective GUI for providing one or more selectable options for managing the given respective resource that was not provisioned.

14. The computing device of claim 11, wherein the respective intermediary databases comprise one respective intermediary database per resource provisioner.

15. The computing device of claim 11, wherein the respective intermediary databases comprise one respective intermediary database per resource provisioner and per resource provisioning gateway entity.

16. The computing device of claim 11, wherein the plurality of second electronic messages includes respective second electronic messages associated with a resource provisioning gateway entity.

17. The computing device of claim 11, wherein the set of operations further comprises: updating one or more of the plurality of second electronic messages initially locked at the respective intermediary databases with a respective provisioning status.

18. The computing device of claim 11, wherein a given second electronic message comprises a record of the respective resource provisioning.

19. The computing device of claim 11, wherein the set of operations further comprises:

accumulating a plurality of first electronic messages, including the first electronic message, the plurality of first electronic messages associated with a first originating region;

accumulating a plurality of further first electronic messages associated with a second originating region, the plurality of further first electronic messages representing first resources associated with the first originating region, and the plurality of first electronic messages representing second resources associated with the second originating region, the first originating region and the second originating region associated with different respective remittance mediums;

comparing respective first remittances associated with unlocked first electronic messages and respective further first remittances associated with unlocked further first electronic messages based on transfers between the different respective remittance mediums to determine accumulated respective first remittances and accumulated respective further first remittances that are the same or about the same; and delivering the accumulated respective first remittances to the respective external databases associated with the first resources associated with the first originating region associated with the accumulated respective further first remittances of the unlocked further first electronic messages; and delivering the accumulated respective further first remittances to the respective external databases associated with the second resources associated with the second originating region associated with the accumulated respective further first remittances of the unlocked further first electronic messages.

20. The computing device of claim 19, wherein accumulating of the plurality of first electronic messages and the plurality of further first electronic messages occurs for a respective given time period.

* * * * *